United States Patent
Hill et al.

(10) Patent No.: US 9,932,457 B2
(45) Date of Patent: Apr. 3, 2018

(54) COMPOSITES FORMED FROM AN ABSORPTIVE FILLER AND A POLYURETHANE

(71) Applicant: BORAL IP HOLDINGS (AUSTRALIA) PTY LIMITED, Sydney (AU)

(72) Inventors: Russell L. Hill, San Antonio, TX (US); Guy Crocco, New Braunfels, TX (US); Russ K. Majors, San Marcos, TX (US)

(73) Assignee: Boral IP Holdings (Australia) Pty Limited, Sydney (AU)

( * ) Notice: Subject to any disclaimer, the term of this patent is extended or adjusted under 35 U.S.C. 154(b) by 0 days.

(21) Appl. No.: 14/355,559

(22) PCT Filed: Apr. 12, 2013

(86) PCT No.: PCT/US2013/036464
§ 371 (c)(1),
(2) Date: Apr. 30, 2014

(87) PCT Pub. No.: WO2014/168633
PCT Pub. Date: Oct. 16, 2014

(65) Prior Publication Data
US 2015/0267029 A1      Sep. 24, 2015

(51) Int. Cl.
*C08K 3/00*    (2018.01)
*C08K 5/17*    (2006.01)
(Continued)

(52) U.S. Cl.
CPC .......... *C08K 3/0033* (2013.01); *C08G 18/163* (2013.01); *C08G 18/1808* (2013.01);
(Continued)

(58) Field of Classification Search
CPC .......... C08K 3/0033; C08K 3/04; C08K 5/17; C08L 175/08; C08L 175/04
See application file for complete search history.

(56) References Cited

U.S. PATENT DOCUMENTS

| 529,535 A | 11/1894 | Smith |
| 529,538 A | 11/1894 | Vaughn |

(Continued)

FOREIGN PATENT DOCUMENTS

| CA | 2037130 C | 1/2006 |
| CN | 1251596 A | 4/2000 |

(Continued)

OTHER PUBLICATIONS

Anonymous, "Cellular Plastics Made by Extrusion", Research Disclosure, Jornal No. 40204, Kenneth Mason Publications Ltd, United Kingdom, 9 pages, Oct. 1997.

(Continued)

*Primary Examiner* — Michael L Leonard
(74) *Attorney, Agent, or Firm* — Alston & Bird LLP

(57) ABSTRACT

Composite materials and methods for their preparation are described herein. The composite materials can comprise a polyurethane and an absorptive filler. The polyurethane can be formed from the reaction of at least one isocyanate selected from the group consisting of diisocyanates, polyisocyanates, and combinations thereof, and one or more isocyanate-reactive monomers. The one or more isocyanate-reactive monomers can comprise at least one polyol and a first isocyanate-reactive monomer which includes one or more isocyanate-reactive functional groups and a moiety configured to associate with the absorptive filler.

19 Claims, 3 Drawing Sheets

(51) Int. Cl.

| | |
|---|---|
| *C08K 3/04* | (2006.01) |
| *C08K 11/00* | (2006.01) |
| *C08G 18/48* | (2006.01) |
| *C08G 18/50* | (2006.01) |
| *C08G 18/54* | (2006.01) |
| *C08G 18/66* | (2006.01) |
| *C08G 18/76* | (2006.01) |
| *C08G 18/16* | (2006.01) |
| *C08G 18/18* | (2006.01) |
| *C08G 18/24* | (2006.01) |
| *C08G 18/32* | (2006.01) |
| *C08G 18/40* | (2006.01) |
| *C08G 18/42* | (2006.01) |
| *C08G 101/00* | (2006.01) |

(52) U.S. Cl.
CPC ......... *C08G 18/24* (2013.01); *C08G 18/3275* (2013.01); *C08G 18/4018* (2013.01); *C08G 18/4027* (2013.01); *C08G 18/4208* (2013.01); *C08G 18/482* (2013.01); *C08G 18/4829* (2013.01); *C08G 18/5021* (2013.01); *C08G 18/544* (2013.01); *C08G 18/546* (2013.01); *C08G 18/6622* (2013.01); *C08G 18/7664* (2013.01); *C08G 18/7671* (2013.01); *C08K 3/04* (2013.01); *C08K 5/17* (2013.01); *C08K 11/00* (2013.01); *C08G 2101/00* (2013.01)

(56) References Cited

U.S. PATENT DOCUMENTS

| | | |
|---|---|---|
| 2,526,033 A | 10/1950 | Lyon |
| 2,817,875 A | 12/1957 | Harris et al. |
| 2,833,730 A | 5/1958 | Barthel, Jr. |
| RE24,514 E | 8/1958 | Hoppe et al. |
| 2,902,388 A | 9/1959 | Szukiewicz |
| 2,983,693 A | 5/1961 | Sievers |
| 3,065,500 A | 11/1962 | Berner |
| 3,071,297 A | 1/1963 | Lee |
| 3,078,240 A | 2/1963 | Hoshino et al. |
| 3,078,512 A | 2/1963 | De Haven |
| 3,178,490 A | 4/1965 | Petrino et al. |
| 3,182,104 A | 5/1965 | Cwik |
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,340,220 A | 9/1967 | Granito et al. |
| 3,409,711 A | 11/1968 | Pashak et al. |
| 3,453,356 A | 7/1969 | Kent, Jr. et al. |
| 3,466,705 A | 9/1969 | Richie |
| 3,520,027 A | 7/1970 | Amos et al. |
| 3,528,126 A | 9/1970 | Ernst et al. |
| 3,566,448 A | 3/1971 | Ernst |
| 3,583,679 A | 6/1971 | Godley, II |
| 3,608,008 A | 9/1971 | Soukup et al. |
| 3,632,091 A | 1/1972 | Ford |
| 3,644,168 A | 2/1972 | Bonk et al. |
| 3,685,804 A | 8/1972 | Stansfield |
| 3,698,731 A | 10/1972 | Jost et al. |
| 3,712,776 A | 1/1973 | Woodham et al. |
| 3,726,624 A | 4/1973 | Schwarz |
| 3,728,288 A | 4/1973 | Cobbs, Jr. et al. |
| 3,732,345 A | 5/1973 | Amos et al. |
| 3,736,081 A | 5/1973 | Yovanovich |
| 3,738,895 A | 6/1973 | Paymal |
| 3,764,247 A | 10/1973 | Garrett et al. |
| 3,768,937 A | 10/1973 | Haga et al. |
| 3,769,053 A | 10/1973 | Pennachetti et al. |
| 3,769,054 A | 10/1973 | Pennachetti et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier |
| 3,841,390 A | 10/1974 | Dibenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,571 A | 11/1975 | Olstowski et al. |
| 3,917,774 A | 11/1975 | Sagane et al. |
| 3,928,258 A | 12/1975 | Alexander |
| 3,932,980 A | 1/1976 | Mizutani et al. |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 4,005,035 A | 1/1977 | Deaver |
| 4,013,616 A | 3/1977 | Wallace |
| 4,023,779 A | 5/1977 | Beloy |
| 4,025,257 A | 5/1977 | Sagane et al. |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schafer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,121,945 A | 10/1978 | Hurst et al. |
| 4,127,040 A | 11/1978 | Moore et al. |
| 4,128,369 A | 12/1978 | Kemerer et al. |
| 4,137,200 A | 1/1979 | Wood et al. |
| 4,137,265 A * | 1/1979 | Edwards ............ C08G 18/5033 521/167 |
| 4,141,862 A | 2/1979 | Raden et al. |
| 4,143,759 A | 3/1979 | Paradis |
| 4,149,840 A | 4/1979 | Tippmann |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,175,870 A | 11/1979 | Warzel |
| 4,180,538 A | 12/1979 | Morikawa et al. |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,229,222 A | 10/1980 | Schneider |
| 4,240,950 A | 12/1980 | Von Vonin et al. |
| 4,241,131 A * | 12/1980 | Bailey .......................... 442/374 |
| 4,243,755 A | 1/1981 | Marx et al. |
| 4,246,363 A | 1/1981 | Turner et al. |
| 4,247,656 A | 1/1981 | Janssen |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Muller et al. |
| 4,256,846 A | 3/1981 | Ohashi et al. |
| 4,260,538 A | 4/1981 | Iseler et al. |
| 4,260,568 A | 4/1981 | Warzel |
| 4,261,946 A | 4/1981 | Goyert et al. |
| 4,268,320 A | 5/1981 | Klingaman et al. |
| 4,272,377 A | 6/1981 | Gerlach et al. |
| 4,275,033 A | 6/1981 | Schulte et al. |
| 4,276,337 A | 6/1981 | Coonrod |
| 4,282,329 A | 8/1981 | Von Bonin et al. |
| 4,282,988 A | 8/1981 | Hulbert, Jr. |
| 4,284,826 A | 8/1981 | Aelony |
| 4,290,248 A | 9/1981 | Kemerer et al. |
| 4,294,750 A | 10/1981 | Klingaman et al. |

(56) References Cited

U.S. PATENT DOCUMENTS

| | | | |
|---|---|---|---|
| 4,296,159 A | 10/1981 | Jenkines et al. | |
| 4,300,776 A | 11/1981 | Taubenmann | |
| 4,324,495 A | 4/1982 | Martinez | |
| 4,330,494 A | 5/1982 | Iwata et al. | |
| 4,331,726 A | 5/1982 | Cleary | |
| 4,338,422 A | 7/1982 | Jackson, Jr. et al. | |
| 4,339,366 A | 7/1982 | Blount | |
| 4,340,681 A | 7/1982 | Reuter et al. | |
| 4,342,847 A | 8/1982 | Goyert et al. | |
| 4,344,873 A | 8/1982 | Wick | |
| 4,347,281 A | 8/1982 | Futcher et al. | |
| 4,359,359 A | 11/1982 | Gerlach et al. | |
| 4,359,548 A | 11/1982 | Blount | |
| 4,366,204 A | 12/1982 | Briggs | |
| 4,367,259 A | 1/1983 | Fulmer et al. | |
| 4,371,629 A * | 2/1983 | Austin | 521/115 |
| 4,376,171 A | 3/1983 | Blount | |
| 4,381,352 A | 4/1983 | McBrayer | |
| 4,382,056 A | 5/1983 | Coonrod | |
| 4,383,818 A | 5/1983 | Swannell | |
| 4,390,581 A | 6/1983 | Cogswell et al. | |
| 4,395,214 A | 7/1983 | Phipps et al. | |
| 4,396,791 A | 8/1983 | Mazzoni | |
| 4,397,983 A | 8/1983 | Hill et al. | |
| 4,412,033 A | 10/1983 | Labelle et al. | |
| 4,414,174 A | 11/1983 | Klempner et al. | |
| 4,439,548 A | 3/1984 | Weisman | |
| 4,450,133 A | 5/1984 | Cafarelli | |
| 4,454,251 A | 6/1984 | Frisch et al. | |
| 4,460,737 A | 7/1984 | Evans et al. | |
| 4,465,500 A | 8/1984 | Motsinger et al. | |
| 4,483,727 A | 11/1984 | Eickman et al. | |
| 4,486,211 A | 12/1984 | Monaghan | |
| 4,489,023 A | 12/1984 | Proksa | |
| 4,490,493 A | 12/1984 | Mikols | |
| 4,512,942 A | 4/1985 | Babbin et al. | |
| 4,514,162 A | 4/1985 | Schulz | |
| 4,525,103 A * | 6/1985 | Meyer et al. | 405/259.6 |
| 4,532,098 A | 7/1985 | Campbell et al. | |
| 4,540,357 A | 9/1985 | Campbell et al. | |
| 4,568,702 A | 2/1986 | Mascioli | |
| 4,576,718 A | 3/1986 | Reischl et al. | |
| 4,576,974 A | 3/1986 | Carroll et al. | |
| 4,581,186 A | 4/1986 | Larson | |
| 4,595,709 A | 6/1986 | Reischl | |
| 4,597,927 A | 7/1986 | Zeitler et al. | |
| 4,600,311 A | 7/1986 | Mourrier et al. | |
| 4,604,410 A | 8/1986 | Altenberg | |
| 4,649,162 A | 3/1987 | Roche et al. | |
| 4,661,533 A | 4/1987 | Stobby | |
| 4,677,157 A | 6/1987 | Jacobs | |
| 4,680,214 A | 7/1987 | Frisch et al. | |
| 4,705,409 A | 11/1987 | Trerice | |
| 4,714,722 A | 12/1987 | Najvar et al. | |
| 4,714,778 A | 12/1987 | Burgoyne, Jr. et al. | |
| 4,717,027 A | 1/1988 | Laure et al. | |
| 4,724,250 A | 2/1988 | Schubert et al. | |
| 4,728,287 A | 3/1988 | Niems | |
| 4,728,288 A | 3/1988 | Niems | |
| 4,734,455 A | 3/1988 | Mobley et al. | |
| 4,737,524 A | 4/1988 | Ako et al. | |
| 4,780,484 A | 10/1988 | Schubert et al. | |
| 4,780,498 A | 10/1988 | Goerrissen et al. | |
| 4,795,763 A | 1/1989 | Gluck et al. | |
| 4,802,769 A | 2/1989 | Tanaka | |
| 4,826,429 A | 5/1989 | Niems | |
| 4,826,944 A | 5/1989 | Hoefer et al. | |
| 4,832,183 A | 5/1989 | Lapeyre | |
| 4,835,195 A | 5/1989 | Rayfield et al. | |
| 4,848,915 A | 7/1989 | Fintel | |
| 4,855,184 A | 8/1989 | Klun et al. | |
| 4,883,826 A * | 11/1989 | Marugg | C07C 217/58 521/164 |
| 4,889,429 A | 12/1989 | Heinzmann et al. | |
| 4,892,891 A | 1/1990 | Close | |
| 4,895,352 A | 1/1990 | Stumpf | |
| 4,948,859 A | 8/1990 | Echols et al. | |
| 4,992,102 A | 2/1991 | Barbour | |
| 4,995,801 A | 2/1991 | Hehl | |
| 5,001,165 A | 3/1991 | Canaday et al. | |
| 5,010,112 A | 4/1991 | Glicksman et al. | |
| 5,028,648 A | 7/1991 | Famili et al. | |
| 5,033,860 A | 7/1991 | Nakamura | |
| 5,051,222 A | 9/1991 | Marten et al. | |
| 5,053,274 A | 10/1991 | Jonas | |
| 5,064,293 A | 11/1991 | Nakamura | |
| 5,087,545 A | 2/1992 | Hagenbach | |
| 5,091,436 A | 2/1992 | Frisch et al. | |
| 5,094,798 A | 3/1992 | Hewitt | |
| 5,096,993 A | 3/1992 | Smith et al. | |
| 5,102,918 A | 4/1992 | Moriya | |
| 5,102,969 A | 4/1992 | Scheffler et al. | |
| 5,106,422 A | 4/1992 | Bennett et al. | |
| 5,110,275 A | 5/1992 | Scheuring | |
| 5,114,630 A | 5/1992 | Newman et al. | |
| 5,120,815 A | 6/1992 | Marugg et al. | |
| 5,149,722 A | 9/1992 | Soukup | |
| 5,149,739 A | 9/1992 | Lee | |
| 5,159,012 A | 10/1992 | Doesburg et al. | |
| 5,160,539 A | 11/1992 | Cochran | |
| 5,166,301 A | 11/1992 | Jacobs | |
| 5,167,899 A | 12/1992 | Jezic | |
| 5,185,117 A | 2/1993 | Hawley | |
| 5,185,420 A | 2/1993 | Smith et al. | |
| 5,186,539 A | 2/1993 | Manser et al. | |
| 5,229,138 A | 7/1993 | Carotti | |
| 5,240,969 A | 8/1993 | Brown | |
| 5,252,697 A | 10/1993 | Jacobs et al. | |
| 5,271,699 A | 12/1993 | Barre et al. | |
| 5,278,195 A | 1/1994 | Volkert et al. | |
| 5,296,545 A | 3/1994 | Heise | |
| 5,299,692 A | 4/1994 | Nelson et al. | |
| 5,300,531 A | 4/1994 | Weaver | |
| 5,302,634 A | 4/1994 | Mushovic | |
| 5,330,341 A | 7/1994 | Kemerer et al. | |
| 5,331,044 A | 7/1994 | Lausberg et al. | |
| 5,340,300 A | 8/1994 | Saeki et al. | |
| 5,342,884 A | 8/1994 | Tabor et al. | |
| 5,344,490 A | 9/1994 | Roosen et al. | |
| 5,358,680 A | 10/1994 | Boissonnat et al. | |
| 5,361,945 A | 11/1994 | Johanson | |
| 5,369,147 A | 11/1994 | Mushovic | |
| 5,375,988 A | 12/1994 | Klahre | |
| 5,391,417 A | 2/1995 | Pike | |
| 5,399,194 A | 3/1995 | Cochran et al. | |
| 5,401,154 A | 3/1995 | Sargent | |
| 5,424,013 A | 6/1995 | Lieberman | |
| 5,424,014 A | 6/1995 | Glorioso et al. | |
| 5,432,204 A | 7/1995 | Farkas | |
| 5,439,623 A | 8/1995 | Fintel | |
| 5,439,711 A | 8/1995 | Vu et al. | |
| 5,453,231 A | 9/1995 | Douglas | |
| 5,455,312 A | 10/1995 | Heidingsfeld et al. | |
| 5,458,477 A | 10/1995 | Kemerer et al. | |
| 5,458,831 A | 10/1995 | Saeki et al. | |
| 5,491,174 A | 2/1996 | Grier et al. | |
| 5,495,640 A | 3/1996 | Mullet et al. | |
| 5,505,599 A | 4/1996 | Kemerer et al. | |
| 5,508,315 A | 4/1996 | Mushovic | |
| 5,514,430 A | 5/1996 | Andersen et al. | |
| 5,518,996 A | 5/1996 | Maroy et al. | |
| 5,522,446 A | 6/1996 | Mullet et al. | |
| 5,527,172 A | 6/1996 | Graham, Jr. | |
| 5,527,833 A | 6/1996 | Kuczynski et al. | |
| 5,532,065 A | 7/1996 | Gubitz et al. | |
| 5,536,310 A | 7/1996 | Brook et al. | |
| 5,536,781 A | 7/1996 | Heidingsfeld et al. | |
| 5,554,713 A | 9/1996 | Freeland | |
| 5,562,141 A | 10/1996 | Mullet et al. | |
| 5,565,239 A | 10/1996 | Pike | |
| 5,565,497 A | 10/1996 | Godbey et al. | |
| 5,566,740 A | 10/1996 | Mullet et al. | |
| 5,567,791 A | 10/1996 | Brauer et al. | |
| 5,569,713 A | 10/1996 | Lieberman | |

(56) References Cited

U.S. PATENT DOCUMENTS

| | | |
|---|---|---|
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,624,491 A | 4/1997 | Liskowitz et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,653,534 A | 8/1997 | Matsumoto et al. |
| 5,681,384 A | 10/1997 | Liskowitz et al. |
| 5,681,915 A | 10/1997 | Lechner et al. |
| 5,688,890 A | 11/1997 | Ishiguro et al. |
| 5,696,205 A | 12/1997 | Muller et al. |
| 5,700,495 A | 12/1997 | Kemerer et al. |
| 5,707,474 A | 1/1998 | Andersen et al. |
| 5,710,231 A | 1/1998 | Fogg et al. |
| 5,723,506 A | 3/1998 | Glorioso et al. |
| 5,728,337 A | 3/1998 | Yoshikawa et al. |
| 5,759,695 A | 6/1998 | Primeaux, II |
| 5,759,730 A | 6/1998 | Hermansen et al. |
| 5,760,133 A | 6/1998 | Heidingsfeld et al. |
| 5,769,281 A | 6/1998 | Bates |
| 5,772,752 A | 6/1998 | Liskowitz et al. |
| 5,776,244 A | 7/1998 | Ahrens |
| 5,782,283 A | 7/1998 | Kendall |
| 5,783,125 A | 7/1998 | Bastone et al. |
| 5,783,629 A | 7/1998 | Srinivasan et al. |
| 5,795,949 A | 8/1998 | Daute et al. |
| 5,798,533 A | 8/1998 | Fishback et al. |
| 5,811,506 A | 9/1998 | Slagel |
| 5,814,256 A | 9/1998 | Greve et al. |
| 5,817,230 A | 10/1998 | Groppo, Jr. et al. |
| 5,817,402 A | 10/1998 | Miyake et al. |
| 5,836,499 A | 11/1998 | Mullet et al. |
| 5,837,742 A | 11/1998 | Fishback |
| 5,844,015 A | 12/1998 | Steilen et al. |
| 5,845,783 A | 12/1998 | Smith |
| 5,849,075 A | 12/1998 | Hopkins et al. |
| 5,872,168 A | 2/1999 | Katoot |
| 5,882,396 A | 3/1999 | Hiorns |
| 5,887,724 A | 3/1999 | Weyand et al. |
| 5,908,701 A | 6/1999 | Jennings et al. |
| 5,929,153 A | 7/1999 | Mori et al. |
| 5,932,337 A | 8/1999 | Edinger |
| 5,934,352 A | 8/1999 | Morgan |
| 5,935,885 A | 8/1999 | Hnat et al. |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfled et al. |
| 5,993,551 A | 11/1999 | Hahn |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,065,862 A | 5/2000 | Althausen |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,133,329 A | 10/2000 | Shieh et al. |
| 6,136,246 A | 10/2000 | Rauwendaal et al. |
| 6,136,870 A | 10/2000 | Triolo et al. |
| 6,139,960 A | 10/2000 | Styron et al. |
| 6,140,381 A | 10/2000 | Rosthauser et al. |
| 6,146,556 A | 11/2000 | Katoot |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,228,933 B1 | 5/2001 | Hiles |
| 6,234,777 B1 | 5/2001 | Sperry et al. |
| 6,235,367 B1 | 5/2001 | Holmes et al. |
| 6,242,098 B1 | 6/2001 | Styron et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,265,457 B1 | 7/2001 | Dolgopolsky et al. |
| 6,271,276 B1 | 8/2001 | Gribble et al. |
| 6,284,841 B1 | 9/2001 | Friesner |
| 6,294,637 B1 | 9/2001 | Brauer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,313,186 B1 | 11/2001 | Kaida et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,364,518 B1 | 4/2002 | Gleich et al. |
| 6,383,599 B1 | 5/2002 | Bell et al. |
| 6,387,504 B1 | 5/2002 | Mushovic |
| 6,399,698 B1 | 6/2002 | Petrovic et al. |
| 6,409,949 B1 | 6/2002 | Tanaka et al. |
| 6,419,864 B1 | 7/2002 | Scheuring |
| 6,420,034 B1 | 7/2002 | Takahashi et al. |
| 6,423,755 B1 | 7/2002 | Allen et al. |
| 6,429,257 B1 | 8/2002 | Buxton et al. |
| 6,431,847 B1 | 8/2002 | Hawley et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,441,534 B2 | 8/2002 | Iino et al. |
| 6,444,153 B1 | 9/2002 | Shah et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,495,772 B2 | 12/2002 | Anstrom et al. |
| 6,508,362 B2 | 1/2003 | Hnatow et al. |
| 6,524,978 B1 | 2/2003 | Moore |
| 6,534,556 B2 | 3/2003 | Lacarte et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,610,756 B1 | 8/2003 | Shimizu et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,646,093 B2 | 11/2003 | Tsuruta et al. |
| 6,649,084 B2 | 11/2003 | Morikawa et al. |
| 6,649,667 B2 | 11/2003 | Clatty |
| 6,676,864 B2 | 1/2004 | Hawley |

(56) References Cited

U.S. PATENT DOCUMENTS

| | | |
|---|---|---|
| 6,686,435 B1 | 2/2004 | Petrovic et al. |
| 6,695,902 B2 | 2/2004 | Hemmings et al. |
| 6,706,774 B2 | 3/2004 | Munzenberger et al. |
| 6,709,717 B2 | 3/2004 | Mushovic |
| 6,767,399 B2 | 7/2004 | Peev et al. |
| 6,769,220 B2 | 8/2004 | Friesner |
| 6,776,596 B2 | 8/2004 | Brussel |
| 6,777,457 B2 | 8/2004 | Dolgopolsky et al. |
| 6,832,430 B1 | 12/2004 | Ogawa et al. |
| 6,849,676 B1 | 2/2005 | Shibano et al. |
| 6,864,296 B2 | 3/2005 | Kurth |
| 6,864,312 B2 | 3/2005 | Moore |
| 6,867,239 B2 | 3/2005 | Kurth |
| 6,871,457 B2 | 3/2005 | Quintero-Flores et al. |
| 6,875,385 B2 | 4/2005 | Hawley et al. |
| 6,881,763 B2 | 4/2005 | Kurth |
| 6,881,764 B2 | 4/2005 | Doesburg et al. |
| 6,903,156 B2 | 6/2005 | Muller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,972,144 B2 | 12/2005 | Roth et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,037,865 B1 | 5/2006 | Kimberly |
| 7,048,431 B2 | 5/2006 | Sieverding et al. |
| 7,063,877 B2 | 6/2006 | Kurth et al. |
| 7,098,291 B2 | 8/2006 | Brinkman |
| 7,101,430 B1 | 9/2006 | Pike et al. |
| 7,132,459 B1 | 11/2006 | Buchel |
| 7,160,976 B2 | 1/2007 | Luhmann et al. |
| 7,188,992 B2 | 3/2007 | Mattingly, Jr. |
| 7,196,124 B2 | 3/2007 | Parker et al. |
| 7,199,168 B2 | 4/2007 | Spitler et al. |
| 7,211,206 B2 | 5/2007 | Brown et al. |
| 7,241,818 B2 | 7/2007 | Hemmings et al. |
| 7,267,288 B2 | 9/2007 | Wheeler, Jr. et al. |
| 7,316,559 B2 | 1/2008 | Taylor |
| 7,491,351 B2 | 2/2009 | Taylor et al. |
| 7,651,645 B2 | 1/2010 | Taylor |
| 7,763,341 B2 | 7/2010 | Brown |
| 7,794,224 B2 | 9/2010 | Butteriss |
| 7,794,817 B2 | 9/2010 | Brown |
| 7,879,144 B2 | 2/2011 | Hemmings et al. |
| 7,993,553 B2 | 8/2011 | Brown |
| 8,024,818 B1 | 9/2011 | Devenport |
| 8,097,325 B2 | 1/2012 | Jenkines |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0065045 A1 | 4/2003 | Falke |
| 2003/0080203 A1 | 5/2003 | Roth et al. |
| 2003/0083394 A1 | 5/2003 | Clatty |
| 2007/0197672 A1 | 8/2007 | Lekovic et al. |
| 2008/0132611 A1 | 6/2008 | Brown |
| 2010/0022717 A1 | 1/2010 | Honma |
| 2010/0116179 A1 | 5/2010 | Baker et al. |
| 2010/0286312 A1 | 11/2010 | Zhang et al. |
| 2010/0292397 A1* | 11/2010 | Brown ............... C08G 18/0895 524/590 |
| 2011/0086931 A1 | 4/2011 | Herrington et al. |
| 2011/0086932 A1 | 4/2011 | Herrington |
| 2011/0086933 A1 | 4/2011 | Herrington et al. |
| 2011/0086934 A1 | 4/2011 | Herrington et al. |
| 2011/0303156 A1* | 12/2011 | Sikka ............... A01K 1/0107 119/165 |
| 2012/0029145 A1 | 2/2012 | Brown |
| 2012/0085264 A1 | 4/2012 | Zhang et al. |
| 2012/0123022 A1 | 5/2012 | Berns et al. |
| 2013/0206040 A1 | 8/2013 | Zhang et al. |

FOREIGN PATENT DOCUMENTS

| | | |
|---|---|---|
| CN | 1052991 C | 5/2000 |
| CN | 1926282 A | 3/2007 |
| DE | 19528938 A1 | 2/1997 |
| DE | 10105812 | 8/2002 |
| DE | 102006021266 A1 | 11/2006 |
| DE | 102007047548 | 4/2009 |
| DE | 102008028287 | 12/2009 |
| DE | 102008063815 A1 | 6/2010 |
| DE | 202008016807 U1 | 6/2010 |
| EP | 0115374 A2 | 8/1984 |
| EP | 0771827 A2 | 5/1997 |
| EP | 0911453 A1 | 4/1999 |
| EP | 1201703 A1 | 5/2002 |
| EP | 1336461 A1 | 8/2003 |
| EP | 1921098 A1 | 5/2008 |
| EP | 1921099 A1 | 5/2008 |
| EP | 1927535 A2 | 6/2008 |
| GB | 2300627 A | 11/1996 |
| GB | 2306909 A | 5/1997 |
| GB | 2347933 A | 9/2000 |
| JP | 08188634 A | 7/1996 |
| JP | 09-030857 | 2/1997 |
| JP | 10-029882 | 2/1998 |
| JP | 11005245 A | 1/1999 |
| JP | 11171960 A | 6/1999 |
| JP | 2001326361 A | 11/2001 |
| JP | 2004131654 A | 4/2004 |
| JP | 2005138567 A | 6/2005 |
| JP | 2012056173 | 3/2012 |
| KR | 2002086327 A | 11/2002 |
| WO | 95/33571 A1 | 12/1995 |
| WO | 97/11114 A1 | 3/1997 |
| WO | 97/21640 A1 | 6/1997 |
| WO | 97/39043 A1 | 10/1997 |
| WO | 97/44373 A1 | 11/1997 |
| WO | 98/08893 A1 | 3/1998 |
| WO | 99/37592 A1 | 7/1999 |
| WO | 99/39891 A1 | 8/1999 |
| WO | 00/04082 A1 | 1/2000 |
| WO | 00/17249 A1 | 3/2000 |
| WO | 00/64993 A1 | 11/2000 |
| WO | 01/23317 A1 | 4/2001 |
| WO | 01/72863 A1 | 10/2001 |
| WO | 01/94470 A1 | 12/2001 |
| WO | 02/01530 A2 | 1/2002 |
| WO | 2004/065469 A1 | 8/2004 |
| WO | 2004/078900 A1 | 9/2004 |
| WO | 2004/113248 A2 | 12/2004 |
| WO | 2005/006349 A1 | 1/2005 |
| WO | 2005/053938 A1 | 6/2005 |
| WO | 2005/056267 A1 | 6/2005 |
| WO | 2005/072187 A2 | 8/2005 |
| WO | 2005/072188 A2 | 8/2005 |
| WO | 2005/094255 A2 | 10/2005 |
| WO | 2005/123798 A1 | 12/2005 |
| WO | 2006/012149 A2 | 2/2006 |
| WO | 2006/114430 A1 | 11/2006 |
| WO | 2006/118995 A1 | 11/2006 |
| WO | 2006/137672 A1 | 12/2006 |
| WO | 2007/014332 A2 | 2/2007 |
| WO | 2007/087175 A2 | 8/2007 |
| WO | 2007/112104 A2 | 10/2007 |
| WO | 2007/112105 A2 | 10/2007 |
| WO | 2008/110222 A1 | 9/2008 |
| WO | 2008/127934 A1 | 10/2008 |
| WO | 2008/154010 A1 | 12/2008 |
| WO | 2009/045926 A1 | 4/2009 |
| WO | 2009/048927 A1 | 4/2009 |

(56) References Cited

FOREIGN PATENT DOCUMENTS

WO   2010/078895 A1   7/2010
WO   2013/043333 A1   3/2013

OTHER PUBLICATIONS

Yih, et al., "Recovery of Cenospheres and Application to the Manufacture of Insulation Materials", Journal of the Chin. I.Ch.E., vol. 19, No. 1,, 1988, pp. 23-29.
Anonymous, "Rigid Polurethane Foams Having a Strut/Window Mass Ratio in the Range of 90/10 to 10/90, Made via Extrusion", Research Disclosure, Journal No. 40264, Kenneth Mason Publications Ltd., United Kingdom, 6 pages, Oct. 1997.
Berry, et al., "Acid-Leached Fly Ash as a Spherical Filler in Polymer Composites", 42nd Annual Conference, 6 pages, Composites Institute, The Society of the Plastics Industry, Inc., Feb. 2-6, 1987.
Berry, et al., "Beneficiated Fly Ash: Hydration, Microstructure, and Strength Development in Portland Cement Systems", Fly Ash, Silica Fume, Slag, and Natrual Pozzolans in Concrete, Proceedings Third International Conference, Trondheim, Norway vol. 1; p. 241-273, American Concrete Institute, Detroit, 1989.
Berry, "Enhanced Resource Recovery by Beneficiation and Direct Acid Leaching of Fly Ash", Fly Ash and Coal Conversion by Products: Characterization, Utilization and Disposal III Symposium, Boston, MA, Dec. 1-3, 1986, pp. 365-380.
Berry, et al., "Investigation of Some New Spherical Fillers", 27 pages, Ontario Research Foundation, Canada, Nov. 1986.
Borrachero, et al., "Improvement of Portland Cement/Fly Ash Mortars Strength Using Classified Fly Ashes", Proceedings of the International Conference on Environmental Implications of Construction with Waste Materials, vol. 2, 1994, pp. 563-570.
Cayli, et al., "Soybean Oil Based Isocyanates: Synthesis, Characterizations, and Polymerizations", Conference Abstract, 2nd Workshop on Fats and Oils as Renewable Feedstock for Chemical Industry, 3 pages, Mar. 22-29, 2009.
Dinelli, "Thermal By-Products Treatment and Valorization", Chemicke Listy, vol. 89, No. 3, Mar. 1995, pp. 137-143.
Dolui,, "Unusual Effect of Filler (CaCO3) on Thermal Degradation of Polyurethane", Journal of Applied Polymer Science, vol. 52 No. 4, John Wiley & Sons, 2003, pp. 463-465.
Guhanathan, et al., "Studies on Castor Oil-Based Polyurethane/Polyacrylonitrile Interpenetrating Polymer Network for Toughening of Unsaturated Polyester Resin", Journal of Applied Polymer Science, vol. 92, No. 2, Apr. 15, 2004, Wiley Subscription Services, New Jersey, 2004, pp. 817-829.
Hemmings, et al., "Evaluation of Plastic Filler Applications for Leached Fly Ash", Electric Power Research Institute, 177 pages, Ontario Research Foundation, Mississauga, Ontario, Canada, Sep. 1986.
Hojabri, et al., "Fatty Acid-Derived Diisocyanate and Biobased Polyurethane Produced from Vegetable Oil: Synthesis, Polymerization, and Characterization", Biomacromolecules, 10(4), American Chemical Society, Mar. 12, 2009, pp. 884-891.
Horvath, Jr., "Structural Polyurethane Foam Reaction Injection Molding", Journal of Cellular Plastics, Sep.-Oct. 1976, pp. 289-293.
Huang, et al., "Processed Low NOx Fly Ash as a Filler in Plastics", Proceedings of Twelfth International Symposium on Management & Use of Coal Combustion Byproducts (CCBs), 25 pages, Orlando, Florida, Jan. 26-30, 1997.
International, "International Search Report and Written Opinion of the International Search Authority", for PCT/US2010/040967, dated Apr. 22, 2011, 10 pages.
International, "International Search Report and Written Opinion of the International Searching Authority", for PCT/US2010/045460, dated Sep. 24, 2010, 9 pages.
Inukai, et al., "Glass Fiber Reinforced Rigid Polyurethane Foam (Eslon Neo-Lumber FFU)", International Progress in Urethanes, vol. 5, Technomic Publishing Co., Inc., Lancaster, PA, 1988, pp. 202-216.
Jablonski, "Fly Ash Utilization as an Extender in Plastics and Paints", International Ash Utilization Symposium, 15 pages., Oct. 1987.
Javni, et al., "Thermal Stability of Polyurethanes Based on Vegetable Oils", Journal of Applied Polymer Science, vol. 77, No. 8, Aug. 22, 2000, John Wiley & Sons, New York, pp. 1723-1734.
Kaas, "Residual Fly Ash Can Replace Talc and Kaolin as Polypropylene Filler", Plastics Design and Processing, Nov. 1978, pp. 49-53.
Madden, et al., "A Study of Polyether-Polyol and Polyester-Polyol-Based Rigid Urethane Foam Systems", Paper submitted to the 162nd National Meeting of the American Chemical Society, Washington D.C.,16 Pages, Sep. 1971.
Morimoto, et al., "Continuous Glass Fiber Reinforced Rigid Polyurethane Foam (Airlite FRU)", International Progress in Urethanes, vol. 5, Technomic Publishing Co., Inc., Lancaster, Pennsylvania, 1988, pp. 82-101.
Nayak, "Natural Oil-Based Polymers: Opportunities and Challenges", J. Macro. Sci. Rev. Macro. Chem. & Phys., C40 (1), Marcel Dekker, Inc., New York, 2000, pp. 1-21.
Okagawa, et al., "Glass Fiber Reinforced Rigid Polyurethane Foam", International Progress in Urethane, vol. 2, Technomic Publishing Co., Inc., Lancaster, Pennsylvania, 1980, pp. 85-97.
Okagawa, et al., "Glass Fibre Reinforced Rigid Polyurethane Foam", Cellular and Non Cellular Polyurethanes, Carl Hanser Verlag Munchen Wien Druck and Bindung, Germany, 1980, pp. 453-467.
Ortel, Polyurethane—Handbook—Chemistry—Raw Materials—Processing—Applications—Properties; Hanser Publishers; New York, 1985, pp. 16-18.
Paya, et al., "Early-Strength Development of Portland Cement Mortars Containing Air Classified Fly Ashes", Cement and Concrete Research, vol. 25, No. 2, Elsevier Science Ltd., United States of America, 1995, pp. 449-456.
Plowman, et al., "The Use of Pulverized Fuel Ash as a Filler in Plastics", Conference Proceedings for the AshTech '84 Second International Conference on Ash Technology and Marketing, Barbican Centre, London, Sep. 16-21, 1984, pp. 663-670.
Shaw, "Abstract: The Use of Fly Ash in the Manufacture of Asphalt Shingles", 12 pages, Jun. 2002.
Szycher, Szycher's Handbook of Polyurethanes; CRC Press, New York, 1999, 1999, pp. 7:16-7:21.
Szycher, "17.7.1 Foam Production by Extruder Method", Szycher's Handbook of Polyurethanes, CRC Press LLC, New York, 1999, pp. 17:21-17:22.
Thames, et al., "Lesquerella: Renewal Resource for Industrial Coatings and Polyurethane Foams", Conference Abstract, Society for the Advancement of Material and Process Engineering, 1996.
Unknown, "Fly Ash Shows Promise as Plastics Filler", C&EN, May 8, 1978, pp. 29-30.
Unknown, "Soya-Based Isocyanate Alternatives Coming? (US Newslines)", Urethanes Technology, Abstract, 2 pages, Apr. 1, 2007.
Unknown, "Standard Practice for Polyurethane Raw Materials: Polyurethane Foam Cup Test", ASTM D7487-08, 5 pages, ASTM International, Pennsylvania, 2008.
Utika, et al., "Properties of High Strength Concrete Using 'Classified Fly Ash'", 4th International Conference on Fly Ash, Silica Fume, Slag and Natural Pozzolans in Concrete, p. 37-47, May 1992.
International Search Report and Written Opinion for PCT/US2013/036464 dated Jan. 6, 2014.
Abstract of Rama, Shetty R. et al., Journal of Reinforced Plastics and Composites, 2010, 29:2099-2104.

* cited by examiner

COMPOSITES FORMED FROM AN ABSORPTIVE FILLER AND A POLYURETHANE

BACKGROUND

Polymeric composite materials that contain organic and/or inorganic filler materials have become desirable for a variety of uses because of their excellent mechanical properties and weathering stability. Foamed versions of these materials can have a relatively low density yet the filler materials can provide a composite material that is extremely strong. The polymer provided in the composite material can help provide good toughness (i.e., resistance to brittle fracture) and resistance to degradation from weathering to the composite when it is exposed to the environment. Thus, polymeric composite materials including organic and/or inorganic fillers can be used in a variety of applications, including in building materials.

Recently, there has been an increased interest in using fly ash as a filler in polymer composites. Fly ash has attracted attention as a filler for several reasons. First, fly ash is a by-product produced during the combustion of coal. As such, fly ash qualifies as a recycled material, making it an environmentally friendly choice for use as a filler in composites. Fly ash is also relatively inexpensive when compared to alternative fillers often used in polymer composites. Furthermore, fly ash can be incorporated in polymer composites without adversely impacting their resultant mechanical properties. In fact, in some cases, fly ash can improve the mechanical properties of polymer composites.

When using fly ash to form polymer composites, difficulties arise in producing composites having consistent batch-to-batch materials properties (e.g., consistent hardness). Depending on its combustion history, fly ash can have varied chemical and physical properties. For example, fly ash obtained from different sources can include varying quantities of residual organic carbon. The residual organic carbon can absorb organic molecules (e.g., polymerization catalysts used to cure the polymer composite), influencing the properties of the resultant polymer composites. Methods for addressing the variation in fly ash performance offer the potential to provide polymeric composites having consistent batch-to-batch materials properties.

SUMMARY

As described herein, absorptive fillers, such as fly ash, can absorb certain catalysts (e.g., amine catalysts) used to form the polyurethane. As a result, absorptive fillers can undesirably influence properties of the polyurethane system, including the tack-free time of the system, by decreasing the amount of available catalyst present during polymerization. This can be especially problematic, given that many absorptive fillers, such as fly ash, can exhibit varying absorptive behavior from sample to sample, for example, depending on the combustion history of the fly ash. As a consequence, it can be difficult to prepare polymeric composites having consistent batch-to-batch materials properties.

The deleterious effects of absorptive fillers can be mitigated by incorporating an isocyanate-reactive monomer in the polyurethane system which includes a moiety configured to associate with the absorptive filler. This isocyanate-reactive monomer, can associate with the absorptive filler during formation of the composite material, freeing up catalyst which may otherwise be absorbed to the filler to participate in reaction of the polyurethane system. As a result, the variance in the properties of the polyurethane system resulting from the presence of the absorptive filler can be reduced.

Composite materials and methods for their preparation are described. The composite materials can comprise a polyurethane and an absorptive filler. The absorptive filler can be a filler, such as fly ash, which is chemically and physically configured to absorb a catalyst (e.g., an amine catalyst) used to form the polyurethane. In some embodiments, the total amount of absorptive filler in the composite material can range from 40% to 90% by weight, based on the total weight of the composition.

The polyurethane can be formed from the reaction of at least one isocyanate selected from the group consisting of diisocyanates, polyisocyanates, and combinations thereof, and one or more isocyanate-reactive monomers. The one or more isocyanate-reactive monomers can comprise at least one polyol and a first isocyanate-reactive monomer which includes one or more isocyanate-reactive functional groups and a moiety configured to associate with the absorptive filler.

The one or more isocyanate-reactive functional groups in the first isocyanate-reactive monomer can be any suitable functional groups which react with an isocyanate to form a covalent bond (e.g., amines, hydroxy groups, or combinations thereof). The moiety configured to associate with the absorptive filler in the first isocyanate-reactive monomer can be any chemical moiety which possesses an affinity for the absorptive filler. For example, the moiety configured to associate with the absorptive filler can be a Lewis basic moiety containing a lone electron pair (e.g., a nitrogen-containing moiety such as a secondary amine, a tertiary amine, or combinations thereof).

In certain embodiments, the first isocyanate-reactive monomer comprises an amine-containing polyol. For example, the first isocyanate-reactive monomer can comprise, for example, an alkanolamine (e.g., an alkylene oxide-capped alkanolamine), an alkoxylated polyamine, a Mannich polyol (e.g., an alkylene oxide-capped Mannich polyol), or a combination thereof. The first isocyanate-reactive monomer can be present in an amount from 5% to 50% by weight (e.g., from 10% to 40% by weight), based on the total weight of the one or more isocyanate-reactive monomers used to form the polyurethane.

The one or more isocyanate-reactive monomers used to form the polyurethane can further include one or more additional polyols. The one or more additional polyols can comprise, for example, a polyester polyol (e.g., aromatic polyester polyol), a polyether polyol (e.g., aromatic polyether polyol), or a combination thereof.

Also provided are methods of preparing the composite materials described herein. The methods can include mixing (1) an absorptive filler; (2) at least one isocyanate selected from the group consisting of diisocyanates, polyisocyanates, and combinations thereof; (3) one or more isocyanate-reactive monomers, wherein the one or more isocyanate-reactive monomers comprise a first isocyanate-reactive monomer which includes one or more isocyanate-reactive functional groups and a moiety configured to associate with the absorptive filler; and (4) a catalyst. The at least one isocyanate and the one or more isocyanate-reactive monomers are allowed to react in the presence of the absorptive filler and catalyst to form the composite material.

DETAILED DESCRIPTION

Figure 1:
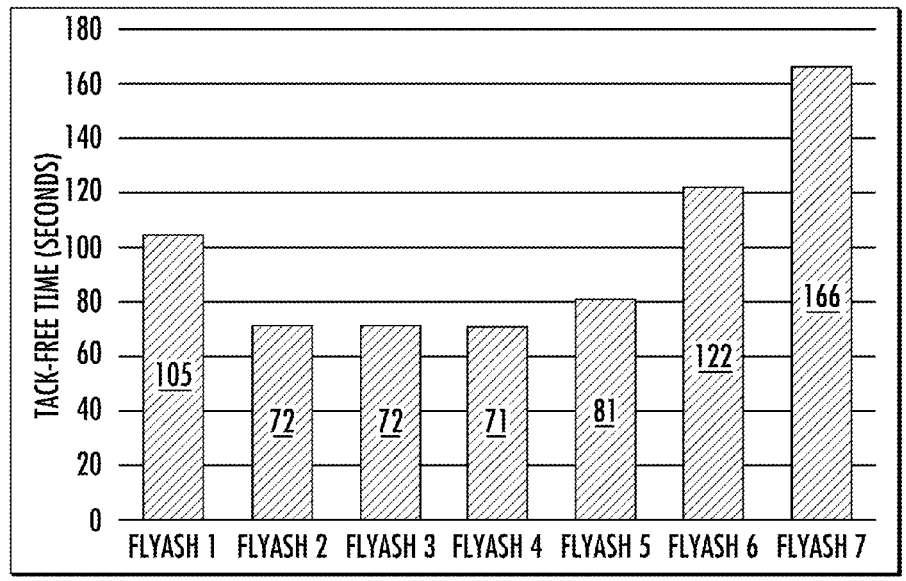
FIG. 1 is a graph illustrating the tack-free time (in seconds) for composite materials formed using seven different samples of fly ash.

Composite materials and methods for their preparation are described herein.

The composite materials can comprise a polyurethane and an absorptive filler. The absorptive filler can be a filler, such as fly ash, which is chemically and physically configured to absorb a catalyst (e.g., an amine catalyst) used to form the polyurethane. In some embodiments, the total amount of absorptive filler in the composite material can be from 40% to 90% by weight, based on the total weight of the composition.

The polyurethane can be formed from the reaction of at least one isocyanate selected from the group consisting of diisocyanates, polyisocyanates, and combinations thereof, and one or more isocyanate-reactive monomers. The one or more isocyanate-reactive monomers comprise at least one polyol and a first isocyanate-reactive monomer which includes one or more isocyanate-reactive functional groups and a moiety configured to associate with the absorptive filler.

Absorptive Fillers

The composite materials described herein include an absorptive filler. Absorptive fillers are fillers which are chemically and physically configured to absorb one or more catalysts used to form a polyurethane (e.g., fillers configured to absorb one or more amine catalysts). Absorptive fillers can possess one or more chemical properties (e.g., organic carbon content), one or more physical properties (e.g., surface area), or a combination thereof which results in a filler which absorbs or otherwise associates with one or more catalysts (e.g., one or more amine catalysts) used to form a polyurethane.

The absorptive nature of an absorptive filler can be qualitatively and/or quantitatively assessed by observing and/or measuring the difference in the tack-free time, as determined using a cup test, of a formulation containing an absorptive filler as compared to the tack-free time of an identical formulation containing a non-absorptive filler (e.g., glass beads) in place of the absorptive filler. In some cases, the formulation containing the absorptive filler has a tack-free time, as determined using the cup test described in the examples, that is at least 5 seconds greater than the tack-free time of an identical formulation containing a non-absorptive filler (e.g., glass beads). For example, the formulation containing the absorptive filler can have a tack-free time, as determined using the cup test, that is at least 10 seconds greater, at least 15 seconds greater, at least 20 seconds greater, at least 25 seconds greater, at least 30 seconds greater, at least 35 seconds greater, at least 40 seconds greater, at least 45 seconds greater, at least 50 seconds greater, at least 55 seconds greater, at least 60 seconds greater, at least 65 seconds greater, at least 70 seconds greater, at least 75 seconds greater, at least 80 seconds greater, at least 85 seconds greater, at least 90 seconds greater, or at least 95 seconds greater than the tack-free time of an identical formulation containing a non-absorptive filler (e.g., glass beads).

The absorptive nature of an absorptive filler can also be qualitatively and/or quantitatively assessed by measuring the total adsorptive capacity of the absorptive filler using a mass titration. Methods of performing mass titrations to determine adsorptive capacity of solid materials (e.g., activated carbon) are known in the art. Generally, such mass titrations can involve adding varying amounts of an absorptive filler to samples of an aqueous solution of 1,4-Diazabicyclo[2.2.2]octane (DABCO, 2.5% by weight). Each sample can then be stirred (e.g., for one minute at 2000 rpm using a mechanical stirrer (Ryobi brand, Model DP-101) equipped with a 2-inch diameter stirring blade) and allowed to rest for two minutes. The absorptive filler can then be removed from the sample (e.g., by filtration), and the amount of DABCO remaining in the sample (i.e., in the supernatant) can be quantified. The amount of DABCO remaining can be plotted as a function of the concentration of absorptive filler added to the samples to obtain an adsorption isotherm for the filler. The absorptive filler can have an adsorption isotherm which indicates that the absorptive filler has a greater propensity to adsorb DABCO than glass beads.

In some embodiments, the absorptive filler comprises a carbonaceous material. Carbonaceous materials are absorptive fillers which include some amount of organic carbon. The amount of organic carbon present in a carbonaceous material can be estimated by measuring the material's loss-on-ignition (LOI). The LOI of a carbonaceous material refers to the percent weight loss of a sample of the carbonaceous material upon ignition at 750° C. for 2 hours, and then further heated at 750° C. to a constant mass to consume any organic carbon present in the material, as described, for example in ASTM C618-12a.

In some embodiments, the absorptive filler has an LOI of at least 0.20% (e.g., at least 0.25%, at least 0.30%, at least 0.35%, at least 0.40%, at least 0.45%, at least 0.50%, at least 0.55%, at least 0.60%, at least 0.65%, at least 0.70%, at least 0.75%, at least 0.80%, at least 0.85%, at least 0.90%, at least 0.95%, at least 1.0%, at least 1.1%, at least 1.2%, at least 1.3%, at least 1.4%, at least 1.5%, at least 1.6%, at least 1.7%, at least 1.8%, at least 1.9%, at least 2.0%, at least 2.25%, at least 2.5%, at least 2.75%, at least 3.0%, at least 3.25%, at least 3.5%, at least 3.75%, at least 4.0%, at least 4.25%, at least 4.5%, at least 4.75%, at least 5.0%, at least 5.25%, at least 5.5%, at least 5.75%, at least 6.0%, at least 6.25%, at least 6.5%, at least 6.75%, at least 7.0%, at least 7.25%, at least 7.5%, at least 7.75%, at least 8.0%, at least 8.25%, at least 8.5%, at least 8.75%, at least 9.0%, at least 9.25%, at least 9.5%, at least 9.75%, at least 10.0%, at least 11%, at least 12%, at least 13%, at least 15%, at least 16%, at least 17%, at least 18%, at least 19%, at least 20%, or more).

In some embodiments, the absorptive filler has an LOI of less than 25% (e.g., less than 20%, less than 19%, less than 18%, less than 17%, less than 16%, less than 15%, less than 14%, less than 13%, less than 12%, less than 11%, less than 10%, less than 9.75, less than 9.5%, less than 9.25%, less than 9.0%, less than 8.75, less than 8.5%, less than 8.25%, less than 8.0%, less than 7.75, less than 7.5%, less than 7.25%, less than 7.0%, less than 6.75%, less than 6.5%, less than 6.25%, less than 6.0%, less than 5.75%, less than 5.5%, less than 5.25%, less than 5.0%, less than 4.75%, less than 4.5%, less than 4.25%, less than 4.0%, less than 3.75%, less than 3.5%, less than 3.25%, less than 3.0%, less than 2.75%, less than 2.5%, less than 2.25%, less than 2.0%, less than 1.9%, less than 1.8%, less than 1.7%, less than 1.6%, less than 1.5%, less than 1.4%, less than 1.3%, less than 1.2%, less than 1.1%, less than 1.0%, less than 0.95%, less than 0.90%, less than 0.85%, less than 0.80%, less than 0.75%, less than 0.70%, less than 0.65%, less than 0.60%, less than 0.55%, less than 0.50%, less than 0.45%, less than 0.40%, less than 0.35%, less than 0.30%, or less than 0.25%).

The absorptive filler can have an LOI ranging from any of the minimum values described above to any of the maximum values described above. For example, the absorptive filler can have an LOI ranging from 0.10% to 25% (e.g., from 0.15% to 15%, from 0.20% to 10%, from 0.20% to 6.0%, from 0.20% to 5.0%, or from 0.20% to 1.0%).

In some embodiments, the absorptive filler has a BET surface area, as measured using ASTM C1069-09, of at least 0.75 $m^2/g$ (e.g., at least 1.0 $m^2/g$, at least 1.1 $m^2/g$, at least 1.2 $m^2/g$, at least 1.3 $m^2/g$, at least 1.4 $m^2/g$, at least 1.5 $m^2/g$, at least 1.6 $m^2/g$, at least 1.7 $m^2/g$, at least 1.8 $m^2/g$, at least 1.9 $m^2/g$, at least 2.0 $m^2/g$, at least 2.5 $m^2/g$, at least 3.0 $m^2/g$, at least 3.5 $m^2/g$, at least 4.0 $m^2/g$, at least 4.5 $m^2/g$, at least 5.0 $m^2/g$, at least 6.0 $m^2/g$, at least 7.0 $m^2/g$, at least 8.0 $m^2/g$, at least 9.0 $m^2/g$, at least 10 $m^2/g$, at least 15 $m^2/g$, at least 20 $m^2/g$, at least 25 $m^2/g$, at least 50 $m^2/g$, at least 75 $m^2/g$, at least 100 $m^2/g$, at least 150 $m^2/g$, at least 250 $m^2/g$, at least 500 $m^2/g$, at least 750 $m^2/g$, or at least 1000 $m^2/g$). In some embodiments, the absorptive filler has a BET surface area, as measured using ASTM C1069-09, of less than 100 $m^2/g$ (e.g., less than 1000 $m^2/g$, less than 750 $m^2/g$, less than 500 $m^2/g$, less than 250 $m^2/g$, less than 150 $m^2/g$, less than 100 $m^2/g$, less than 75 $m^2/g$, less than 50 $m^2/g$, less than 25 $m^2/g$, less than 20 $m^2/g$, less than 15 $m^2/g$, less than 10 $m^2/g$, less than 9.0 $m^2/g$, less than 8.0 $m^2/g$, less than 7.0 $m^2/g$, less than 6.0 $m^2/g$, less than 5.0 $m^2/g$, less than 4.5 $m^2/g$, less than 4.0 $m^2/g$, less than 3.5 $m^2/g$, less than 3.0 $m^2/g$, less than 2.5 $m^2/g$, less than 2.0 $m^2/g$, less than 1.9 $m^2/g$, less than 1.8 $m^2/g$, less than 1.7 $m^2/g$, less than 1.6 $m^2/g$, less than 1.5 $m^2/g$, less than 1.4 $m^2/g$, less than 1.3 $m^2/g$, less than 1.2 $m^2/g$, less than 1.1 $m^2/g$, less than 1.0 $m^2/g$, or less).

The absorptive filler can have a BET surface area ranging from any of the minimum values described above to any of the maximum values described above. For example, the absorptive filler can have a BET surface area ranging from 0.75 $m^2/g$ to 1000 $m^2/g$ (e.g., 0.75 $m^2/g$ to 500 $m^2/g$, 0.75 $m^2/g$ to 150 $m^2/g$, from 0.75 $m^2/g$ to 50 $m^2/g$, from 0.75 $m^2/g$ to 15 $m^2/g$, from 0.75 $m^2/g$ to 5.0 $m^2/g$, or from 1.0 $m^2/g$ to 4.0 $m^2/g$).

In some embodiments, the absorptive filler can have a ratio of BET surface area to LOI ratio (i.e., BET/LOI) of at least 1.0 (e.g., at least 1.5, at least 2.0, at least 2.5, at least 3.0, at least 3.5, at least 4.0, at least 4.5, at least 5.0, or at least 5.5) measuring BET in $m^2/g$ and the LOI in %. In some embodiments, the absorptive filler can have a ratio of BET surface area to LOI of less than 6.0 (e.g., less than 5.5, less than 5.0, less than 4.5, less than 4.0, less than 3.5, less than 3.0, less than 2.5, less than 2.0, or less than 1.5).

The absorptive filler can have a ratio of BET surface area to LOI from any of the minimum values described above to any of the maximum values described above. For example, the absorptive filler can have a ratio of BET surface area to LOI from 1.0 to 6.0 (e.g., from 1.5 to 5.5, or from 2.0 to 5.0).

The absorptive filler can include fly ash. The term "fly ash" is used herein generally to refer to ash by-products of the combustion of pulverized coal (e.g., in electrical power generation plants). The term fly ash, as used herein, can thus include flue-ash (i.e., fine ash particles generated during the combustion of coal that rise with flue gases, and are captured with particle filtration equipment before the exiting the chimney of a coal-fired power plant), bottom ash (e.g., ash produced during the combustion of coal which does not rise with flue gases), as well as a combination thereof (i.e., coal ash).

Fly ash is formed of mineral matter that is typically of very fine particle size, ranging from less than 1 micron to over 100 microns in some cases. The fly ash particles possess a substantially spherical shape as a consequence of the high temperature melting and coalescence in the furnace of the mineral matter accompanying the coal. The fine particle size and spherical shape are advantageous properties of the fly ash and are in marked contrast to the properties of many conventional fillers such as ground limestone or calcium carbonate, which are typically relatively coarse with an irregular, blocky particle shape.

Mineralogically, fly ash is predominantly amorphous, or non-crystalline, in nature as a result of the rapid quenching of clay/shale minerals as they rapidly pass through the boiler flame and dust collection system of the power plant. For some fly ashes, the amorphous material can be described as an aluminosilicate glass similar in composition to the mineral mullite ($Al_6Si_2O_{13}$); for other fly ashes, it can be described as a calcium aluminosilicate glass similar in composition to the mineral anorthite ($CaAl_2Si_2O_8$). Fly ashes can also contain smaller amounts of a variety of other mineral components derived from thermal modification of accessory minerals present in the coal. These can include mullite, quartz ($SiO_2$), ferrite spinel ($Fe_3O_4$), hematite ($Fe_2O_3$), dicalcium silicate ($Ca_2SiO_4$), tricalcium aluminate ($Ca_3Al_2O_6$), and lime (CaO). These mineral components can occur as inclusions in the glass particles and/or as discrete particles.

It is commonly known that the chemical composition of fly ash changes as a result of the type of coal being burned in the boiler. These differences are largely in the relative proportions of the element calcium present in the ash. For example, high rank bituminous coals generally have a low calcium content and produce an ash with relatively low calcium, typically less than 5% CaO; whereas low rank thermal coals generally have much higher content of calcium, typically in the range 8-20% CaO for lignite coals and 20-30% CaO, or higher, for subbituminous coals. These differences are recognized by ASTM specifications, such as ASTM C-618, and by Canadian specifications that classify the ashes based on their CaO content.

Current ASTM C-618 (Coal Fly Ash or Calcined Natural Pozzolan for Use in Concrete) specifications include only two designations or classes of fly ash: "Class F" and "Class C" fly ashes. The "Class F" designation generally incorporates fly ashes originating from the combustion of bituminous and lignite coals and the "Class C" designation generally incorporates ashes from the combustion of subbituminous coals. These designations are based on the chemical composition of the fly ash in such a way that when the sum of the element oxides ($SiO_2+Al_2O_3+Fe_2O_3$) derived from chemical analysis of the ash is equal to or greater than 70% by weight, then the fly ash is designated a "Class F" fly ash. When the sum of the element oxides is equal to or greater than 50% by weight, the fly ash is designated as a "Class C" fly ash. In Canada, as mentioned above, fly ashes have certain designations based on their CaO content. In particular, a fly ash is considered a "Class F" when it includes less than 8% CaO, a "Class CI" when it includes 8-20% CaO, and a "Class CH" when it includes greater than 20% CaO.

The fly ash can be a lignite fly ash, a subbituminous fly ash, a bituminous fly ash, or a blend of two or more fly ashes (e.g., a subbituminous/bituminous fly ash blend). The fly ash can be a Class C fly ash, a Class F fly ash, or a blend thereof. In certain embodiments, the absorptive filler includes fly ash having an LOI ranging from 0.20% to 10% (e.g., from 0.20% to 5.0%, or from 0.20% to 1.0%), a BET surface area ranging from 0.75 $m^2$/g to 15 $m^2$/g (e.g., from 0.75 $m^2$/g to 5.0 $m^2$/g, or from 1.0 $m^2$/g to 4.0 $m^2$/g), and/or a BET surface area to LOI ratio ranging from 1.0 to 6.0 (e.g., from 1.5 to 5.5, or from 2.0 to 5.0).

Other suitable absorptive fillers include graphite, activated carbon, amorphous carbon (e.g., carbon black), absorptive clays (e.g., absorptive silicate minerals such as kaolin), other combustion ashes, and combinations thereof. For example, the other combustion ash can be ash produced by firing one or more fuels including industrial gases, petroleum coke, petroleum products, municipal solid waste, paper sludge, wood, sawdust, refuse derived fuels, switchgrass, or other biomass material. These absorptive fillers can be used alone, or in combination with fly ash. In some embodiments, the absorptive filler consists of or consists essentially of fly ash.

The composites described herein can include at least 40% by weight absorptive filler, based on the total weight of the composite (e.g., at least 45% by weight, at least 50% by weight, at least 55% by weight, at least 60% by weight, at least 65% by weight, at least 70% by weight, at least 75% by weight, at least 80% by weight, or at least 85% by weight). In some embodiments, the composites can include 90% or less by weight absorptive filler, based on the total weight of the composite (e.g., less than 85% by weight, less than 80% by weight, less than 75% by weight, less than 70% by weight, less than 65% by weight, less than 60% by weight, less than 55% by weight, less than 50% by weight, or less than 45% by weight).

The absorptive filler can be present in the composition in an amount from any of the minimum values described above to any of the maximum values described above. For example the total amount of absorptive filler in the composite material can range 40% to 90% by weight, based on the total weight of the composition (e.g., from 50% to 85% by weight, or from 60% to 80% by weight).

Isocyanates

The polyurethane systems used to form the composite materials described herein include one or more isocyanate monomers. Suitable isocyanates that can be used to form the composite materials include one or more monomeric or oligomeric poly- or di-isocyanates. The monomeric or oligomeric poly- or di-isocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 50% by weight (e.g., from about 25% to about 35% by weight). Examples of useful isocyanates are found, for example, in *Polyurethane Handbook: Chemistry, Raw Materials, Processing Application, Properties,* $2^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate (methylene diphenyl diisocyanate; MDI); polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

In some embodiments, the at least one isocyanates can include 50% or more of one or more highly reactive isocyanates. Suitable highly reactive isocyanates when replacing the isocyanate used in the standard polyurethane formulation of the Brookfield Viscosity Test (i.e. Mondur MR Light) can produce a Brookfield viscosity of over 50,000 mPa·s in less than 400 seconds, less than 380 seconds, less than 360 seconds, less than 340 seconds, less than 320 seconds, or even less than 300 seconds. An exemplary highly reactive isocyanate includes Econate 31, an isocyanate commercially available from Ecopur Industries.

The average functionality of isocyanates useful with the composites described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated above, in the composite materials described herein, an isocyanate is reacted with a polyol to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

Isocyanate-Reactive Monomers

The polyurethane systems used to form the composite materials described herein include one or more isocyanate-reactive monomers. The one or more isocyanate-reactive monomers can include at least one polyol and a first isocyanate-reactive monomer which includes one or more isocyanate-reactive functional groups and a moiety configured to associate with the absorptive filler.

As described above, the first isocyanate-reactive monomer includes one or more isocyanate-reactive functional groups and a moiety configured to associate with the absorptive filler. The one or more isocyanate-reactive functional groups can be suitable functional groups which react with an isocyanate to form a covalent bond. For example, the one or more isocyanate-reactive functional groups can include amines, hydroxy groups, or combinations thereof.

The first isocyanate-reactive monomer can include one or more moiety configured to associate with the absorptive filler. In some embodiments, the first isocyanate-reactive monomer includes a singly moiety configured to associate with the absorptive filler. In other embodiments, the first isocyanate-reactive monomer includes two or more moieties configured to associate with the absorptive filler.

The moiety configured to associate with the absorptive tiller can be any chemical moiety which possesses an affinity for the absorptive filler. For example, the moiety configured to associate with the absorptive filler can be a Lewis basic moiety containing a lone electron pair (e.g., a nitrogen-containing moiety such as an amine). In some embodiments, the moiety configured to associate with the absorptive filler comprises a secondary amine, a tertiary amine, or combinations thereof. In certain embodiments, the moiety configured to associate with the absorptive filler comprises an amine, and the one or more isocyanate-reactive functional groups comprise one or more amines, one or more hydroxy groups, or combinations thereof. The first isocyanate-reactive monomer can be a polyol and/or a polyamine. In certain embodiments, the first isocyanate-reactive monomer comprises an amine-containing polyol.

In some embodiments, the first isocyanate-reactive monomer comprises an alkanolamine. The alkanolamine can be a dialkanolamine, a trialkanolamine, or a combination thereof.

Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof.

Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl) amine, hydroxypropyl di(hydroxyethyl)amine, tri(hydroxypropyl)amine, hydroxyethyl di(hydroxy-n-butyl) amine, hydroxybutyl di(hydroxypropyl)amine, and combinations thereof.

The first isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the first isocyanate-reactive monomer comprises an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The first isocyanate-reactive monomer can comprise a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl group. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine can include a monoalkanolamine, a dialkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt. % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

The first isocyanate-reactive monomer can comprise a polyamine Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group.

By way of example, the polyamine can be polyether polyamine, such as polyoxyalkylene diamine or polyoxyalkylene triamine Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

The first isocyanate-reactive monomer can be present in varying amounts relative the one or more isocyanate-reactive monomers used to form the polyurethane. In some embodiments, the first isocyanate-reactive monomer is present in at least 5% by weight (e.g., at least 10%, at least 15%, at least 20%, at least 25%, at least 30%, at least 35%, at least 40%, or at least 45%), based on the total weight of the one or more isocyanate-reactive monomers used to form the polyurethane. In some embodiments, the first isocyanate-reactive monomer is 50% or less by weight of the one or more isocyanate-reactive monomers used to form the polyurethane (e.g., 45% or less, 40% or less, 35% or less, 30% or less, 25% or less, 20% or less, 15% or less, or 10% or less).

The first isocyanate-reactive monomer can be present in an amount ranging from any of the minimum values described above to any of the maximum values described above. For example, the first isocyanate-reactive monomer can be present in an amount ranging from 5% to 50% by weight (e.g., from 10% to 40% by weight), based on the total weight of the one or more isocyanate-reactive monomers used to form the polyurethane.

The one or more isocyanate-reactive monomers used to form the polyurethane can further include one or more polyols (in addition to the amine polyols described above). Any suitable polyols may be used. Suitable additional polyols for the formation of polymeric composites are known in the art, and can be selected in view of the desired properties of the polymeric composite. In some cases, the one or more polyols comprise a polyester polyol (e.g., aromatic polyester polyol), a polyether polyol (e.g., aromatic polyether polyol), or a combination thereof.

In some embodiments, the one or more additional polyols include a highly reactive polyol. In some embodiments, the one or more additional polyols can include 50% or more of one or more highly reactive polyols. For example, the one or more additional polyols can include greater than 55%, greater than 60%, greater than 65%, greater than 70%, greater than 75%, greater than 80%, greater than 85%, greater than 90%, greater than 95%, or about 100% of one or more highly reactive polyols.

In some embodiments, the one or more highly reactive polyols have a primary hydroxyl number of greater than about 250. As used herein, the primary hydroxyl number is defined as the hydroxyl number multiplied by the percentage of primary hydroxyl groups based on the total number of hydroxyl groups in the polyol. For example, the primary hydroxyl group number can be greater than about 255, greater than about 260, greater than about 265, greater than about 270, greater than about 275, greater than about 280, greater than about 285, greater than about 290, or greater than about 295. In some examples, the highly reactive polyol has a hydroxyl number of greater than about 300, greater than about 305, greater than about 310, greater than about 315, greater than about 320, greater than about 325, greater than about 330, greater than about 335, greater than about 340, greater than about 345, or greater than about 350.

In some embodiments, the one or more highly reactive polyols include a large number of primary hydroxyl groups (e.g. about 75% or more) based on the total number of hydroxyl groups in the polyol. For example, the highly reactive polyols can include about 80% or more, about 85% or more, about 90% or more, about 95% or more, or about 100% of primary hydroxyl groups. The number of primary hydroxyl groups can be determined using fluorine NMR spectroscopy as described, for example, in ASTM D4273, which is hereby incorporated by reference in its entirety.

In some embodiments, the one or more highly reactive polyols produce a Brookfield viscosity rise to a Brookfield viscosity of over 50,000 mPa·s in less than about 225 seconds when used to replace the polyols used in the standard polyurethane formulation of the Brookfield Viscosity Test (i.e., Multranol 4035 and Arcol LHT-240). The Brookfield Viscosity Test is described, for example, in

*Polyurethane Handbook: Chemistry, Raw Materials, Processing Application, Properties*, 2$^{nd}$ Edition, Ed: Gunter Oertel; Hanser/Gardner Publications, Inc., Cincinnati, Ohio; *Rigid Plastic Foams*, T. H. Ferrigno (1963); and *Reaction Polymers: Polyurethanes, Epoxies, Unsaturated Polyesters, Phenolics, Special Monomers and Additives: Chemistry, Technology, Applications*, Wilson F. Gum et al. (1992), which are all herein incorporated by reference. In some embodiments, the one or more highly reactive polyols produce a Brookfield viscosity rise in the Brookfield Viscosity Test to a viscosity of over 50,000 mPa·s in less than about 220 seconds, less than about 210 seconds, less than about 200 seconds, less than about 190 seconds, less than about 180 seconds, less than about 170 seconds, less than about 160 seconds, or less than about 150 seconds.

Exemplary highly reactive polyols include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., a primary hydroxyl number of 288-304 mg KOH/g, and a viscosity rise when used to replace the polyols used in the standard polyurethane formulation of the Brookfield Viscosity Test of over 50,000 mPa·s in less than about 150 seconds. In some embodiments, the highly reactive plant-based polyols can be formed by the reaction of a soybean oil and a polyester to produce a plant-based polyester polyol. For example, the soybean oil-based polyol can be formed by the reaction of a soybean oil and a recycled polyester. In some embodiments, the high hydroxyl number polyol can include renewable and recyclable content.

The one or more highly reactive polyols can be present in varying amounts relative the one or more isocyanate-reactive monomers used to form the polyurethane. In some embodiments, the one or more highly reactive polyols are present in at least 5% by weight (e.g., at least 10%, at least 15%, at least 20%, at least 25%, at least 30%, at least 35%, at least 40%, or at least 45%), based on the total weight of the one or more isocyanate-reactive monomers used to form the polyurethane. In some embodiments, the one or more highly reactive polyols are 50% or less by weight of the one or more isocyanate-reactive monomers used to form the polyurethane (e.g., 45% or less, 40% or less, 35% or less, 30% or less, 25% or less, 20% or less, 15% or less, or 10% or less).

The one or more highly reactive polyols can be present in an amount ranging from any of the minimum values described above to any of the maximum values described above. For example, the one or more highly reactive polyols can be present in an amount ranging from 5% to 50% by weight (e.g., from 10% to 40% by weight), based on the total weight of the one or more isocyanate-reactive monomers used to form the polyurethane.

In some embodiments, the one or more additional polyols include one or more plant-based polyols or non plant-based polyols. The one or more plant-based polyols useful with the composite materials described herein can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the composite materials described herein include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the at least one polyol can include castor oil. Castor oil is a well-known, commercially available material, and is described, for example, in Encyclopedia of Chemical Technology, Volume 5, John Wiley & Sons (1979). Suitable castor oils include those sold by Vertellus Specialties, Inc., e.g., DB® Oil, and Eagle Specialty Products, e.g., T31® Oil. In some embodiments, the one or more plant-based polyols can be derived from soybean oil as the plant-based oil. For example, the plant-based polyols can be highly reactive polyols derived from soybean oil as described above.

In some embodiments, the one or more additional polyols include a less reactive polyol. For example, the one or more additional polyols can include one or more less reactive polyols in addition to one or more highly reactive polyols present in the composition. Less reactive polyols can have lower numbers of primary hydroxyl groups, lower primary hydroxyl numbers, and higher times to reach 50,000 mPa·s using the Brookfield Viscosity Test, than the highly reactive polyols. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. The less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Less reactive polyols can also have Brookfield viscosity rise to over 50,000 mPa·s when used to replace the polyols in the standard polyurethane formulation of the Brookfield Viscosity Test of greater than about 300 seconds, greater than about 350 seconds, greater than about 400 seconds, greater than about 450 seconds, greater than about 500 seconds, greater than about 550 seconds, or even greater than about 600 seconds. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

In some embodiments, greater than 0% (e.g., at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, or at least 85%) by weight of the one or more isocyanate-reactive monomers used to form the polyurethane comprise polyester polyols, polyether polyols, or combinations thereof. In some embodiments, 90% or less (e.g., 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less) by weight of the one or more isocyanate-reactive monomers used to form the polyurethane comprise polyester polyols, polyether polyols, or combinations thereof. In some embodiments, the one or more additional polyols include an aromatic polyester polyol such as those sold under the TEROL® trademark (e.g., TEROL® 198).

The one or more isocyanate-reactive monomers used to form the polyurethane can comprise polyester polyols, polyether polyols, or combinations thereof in an amount ranging from any of the minimum values described above to any of the maximum values described above. For example, the one or more isocyanate-reactive monomers used to form the polyurethane can comprise polyester polyols, polyether polyols, or combinations thereof in an amount ranging from greater than 0% to 90% by weight (e.g., from 40% to 90% by weight, or from 70% to 90% by weight).

The one or more additional polyols can have an average functionality of from 1.0 to 8.0 (e.g., from 1.5 to 8.0, from 1.6 to 6.0, from 1.8 to 4.0, from 2.5 to 3.5, or from 2.6 to 3.1). The average hydroxyl number values (as measured in units of mg KOH/g) for the one or more additional polyols can be from 25 to 600 (e.g., from 100 to 600, from 150 to 550, from 200 to 500, from 250 to 440, from 300 to 415, or from 340 to 400).

Catalysts

One or more catalysts are added to facilitate curing and can be used to control the curing time of the polyurethane matrix. Examples of suitable catalysts include amine-containing catalysts (such as 1,4-diazabicyclo[2.2.2] octane (DABCO or triethylenediamine and tetramethylbutanediamine), tin catalysts (e.g., an organotin catalyst such as dimethyltin oleate), as well mercury- and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

In some embodiments, a catalyst which does not substantially associate with the absorptive filler is employed in the polyurethane system. For example, organometallic catalysts, such as organotin catalysts (e.g., dimethyltin oleate), do not substantially associate with absorptive fillers comprising organic carbon.

In certain embodiments, the absorptive filler comprises organic carbon, and the amount of organic carbon provided by the absorptive filler in the composite is at least 0.1% by weight of the composite (e.g., at least 0.25%, at least 0.5%, at least 0.75%, at least 1.0%, at least 1.5%, at least 2.0%, at least 3.0%, at least 4.0%, or at least 5.0%). In these cases, the polyurethane system can include an organotin catalyst that does not substantially associate with the organic carbon in the absorptive filler.

In some embodiments, the weight ratio of organotin catalyst to the organic carbon provided by the absorptive filler is at least 1:1 (e.g., at least 2:1, at least 3:1, at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, at least 17:1, at least 18:1, or at least 19:1). In some embodiments, the weight ratio of organotin catalyst to the organic carbon provided by the absorptive filler is 20:1 or less (e.g., 19:1 or less, 18:1 or less, 17:1 or less, 16:1 or less, 15:1 or less, 14:1 or less, 13:1 or less, 12:1 or less, 11:1 or less, 10:1 or less, 9:1 or less, 8:1 or less, 7:1 or less, 6:1 or less, 5:1 or less, 4:1 or less, 3:1 or less, or 2:1 or less,).

The weight ratio of organotin catalyst to the organic carbon provided by the absorptive filler can range from any of the minimum values described above to any of the maximum values described above. For example, the weight ratio of organotin catalyst to the organic carbon provided by the absorptive filler can range from 1:1 to 20:1 (e.g., from 1:1 to 15:1, or from 1:1 to 10:1).

In some of these embodiments, the catalyst does not include a catalyst that associates with the absorptive filler. For example, in certain embodiments, the absorptive filler comprises organic carbon, and the catalyst does not include an amine catalyst.

In other embodiments, the catalyst comprises a first catalyst which does not substantially associate with the absorptive filler is employed in the polyurethane system, and a second catalyst which does associate with the absorptive filler is employed in the polyurethane system. For example, in certain embodiments, the absorptive filler comprises organic carbon, and the catalyst comprises a first catalyst which does not substantially associate with the absorptive filler is employed in the polyurethane system, such as an organotin catalyst (e.g., dimethyltin oleate), and a second catalyst which does associate with the absorptive filler (e.g., an amine catalyst).

In certain embodiments, the weight ratio of the organotin catalyst to the amine catalyst is at least 1:3 (e.g., at least 1:2, at least 1:1.75, at least 1:1.5, at least 1:1.25, at least 1:1.20, at least 1:1.15, at least 1:1.10, at least 1:1, at least 1.10:1, at least 1.15:1, at least 1.20:1, at least 1.25:1, at least 1.5:1, at least 1.75:1, at least 2:1, at least 2.5:1, at least 3:1, at least 4:1, at least 5:1, at least 10:1, or more). In certain embodiments, the weight ratio of the organotin catalyst to the amine catalyst is less than 2:1 (e.g., less than 1.75:1, less than 1.5:1, less than 1.25:1, less than 1.20:1, less than 1.15:1, less than 1.10:1, less than 1:1, less than 1:1.10, less than 1:1.15, less than 1:1.20, less than 1:1.25, less than 1:1.5, less than 1:1.75, or less than 1:2).

The weight ratio of the organotin catalyst to the amine catalyst can range from any of the minimum values described above to any of the maximum values described above. For example, the weight ratio of the organotin catalyst to the amine catalyst can range from 2:1 to 1:2 (e.g., from 2:1 to 1:1.10, from 2:1 to 1:1, or from 2:1 to 1.20:1).

Additional Components

Additional components useful with the composite materials described herein include additional fillers, foaming agents, blowing agents, surfactants, chain-extenders, cross-linkers, coupling agents, UV stabilizers, fire retardants, antimicrobials, anti-oxidants, and pigments. Though the use of such components is well known to those of skill in the art, some of these additional additives are further described herein.

One or more additional fillers can be used in the composite materials described herein. Examples of additional fillers useful with the composite materials include other types of ash such as those produced by firing fuels including industrial gases, petroleum coke, petroleum products, municipal solid waste, paper sludge, wood, sawdust, refuse derived fuels, switchgrass or other biomass material. The one or more additional fillers can also include ground/recycled glass (e.g., window or bottle glass); milled glass; glass spheres; glass flakes; calcium carbonate; aluminum trihydrate (ATH); silica; sand; ground sand; silica fume; slate dust; crusher fines; red mud; mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

In some embodiments, inorganic fibers or organic fibers can be included in the polymer composite, e.g., to provide increased strength, stiffness or toughness. Fibers suitable for use with the composite materials described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the composite material exits the mixing apparatus. The fibers can be up to about 2 in. in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of additional fillers in the composite materials as described herein can modify and/or improve the chemical and mechanical properties of the composite materials. For example, the optimization of various properties of the composite materials allows their use in building materials and other structural applications. High filler loading levels can be used in composite materials without a substantial reduction of (and potentially an improvement in) the intrinsic structural, physical, and mechanical properties of a composite. The use of filled composites as building materials has advantages over composite materials made using lower filler levels or no filler. For example, the use of higher filler loading levels in building materials may allow the building materials to be produced at a substantially decreased cost.

Foaming agents and blowing agents may be added to the composite materials described herein to produce a foamed version of the composite materials. Examples of blowing agents include organic blowing agents, such as halogenated hydrocarbons, acetone, pentanes, carbon dioxide, and other materials that have a boiling point below the reaction temperature. Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate.

The addition of excess foaming or blowing agents above what is needed to complete the foaming reaction can add strength and stiffness to the composite material, improve the water resistance of the composite material, and increase the thickness and durability of the outer skin of the composite material. Such excessive blowing agent may produce a vigorously foaming reaction product. To contain the reaction product, a forming device that contains the pressure or restrains the materials from expanding beyond the design limits may be used, such as a stationary or continuous mold.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as DC-197 and DC-193 (Air Products; Allentown, Pa.) can be used.

Low molecular weight reactants such as chain-extenders and/or crosslinkers can be included in the composite materials described herein. These reactants help the polyurethane system to distribute and contain the inorganic filler and/or fibers within the composite material. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the at least one polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

The polyurethane system can optionally be a highly reactive system. In some cases, the polyurethane is formed from one or more highly reactive polyols and/or highly reactive isocyanates in the presence of an absorptive filler. In some embodiments, the polyurethane system, when tested in a Brookfield Viscosity Test, produces a Brookfield viscosity increase to over 50,000 mPa·s in less than about 225 seconds, less than about 220 seconds, less than about 210 seconds, less than about 200 seconds, less than about 190 seconds, less than about 180 seconds, less than about 170 seconds, less than about 160 seconds, or less than about 150 seconds.

In some embodiments, the unfilled polyurethane (i.e., only the polyol, isocyanate, catalyst, and other non-filler additives) produces a surface temperature rise in a cup test of at least about 120° F. In other words, when the at least one isocyanate, the at least one polyol, the at least one catalyst, and any non-filler additives are mixed together in the amounts used in the polyurethane without fly ash or other fillers (e.g., fibers), the mixture produces a surface temperature rise in a cup test of at least 120° F. The surface temperature rise can be at least about 125° F., at least about 130° F., at least about 135° F., at least about 140° F., at least about 145° F., or even at least about 150° F.

In some embodiments, it is desirable to maximize cream time of the composite material while limiting the tack free time of the composite material, particularly in the continuous production of building materials. In some embodiments, the composite material has a cream time (the time for the polyurethane blowing reaction to initiate) of at least 5 seconds, at least 10 seconds, at least 15 seconds, at least 20 seconds, at least 25 seconds, or even at least 30 seconds. In some embodiments, the composite material has a wet tack-free time, as determined using ASTM D7487-08, of less than 100 second, less than 90 seconds, less than 85 seconds, less than 80 seconds, less than 75 seconds, less than 70 seconds, less than 65 seconds, or less than 60 seconds. Thus, the polyurethane composites can be demolded quickly resulting in faster production rates.

A method of preparing a composite material is also described herein. The method can include mixing (1) an absorptive filler; (2) at least one isocyanate selected from the group consisting of diisocyanates, polyisocyanates, and combinations thereof; (3) one or more isocyanate-reactive monomers, wherein the one or more isocyanate-reactive monomers comprise a first isocyanate-reactive monomer which includes one or more isocyanate-reactive functional groups and a moiety configured to associate with the absorptive filler; and (4) a catalyst. The at least one isocyanate and the one or more isocyanate-reactive monomers are allowed to react in the presence of the absorptive filler and catalyst to form the composite material. The composite material can be produced using a batch, semi-batch, or continuous process. At least a portion of the mixing step, reacting step, or both, can be conducted in a mixing apparatus such as a high speed mixer or an extruder. The method can further include the step of extruding the resulting composite material through a die or nozzle.

In some embodiments, a mixing step of the method used to prepare the composite materials described herein includes: (1) mixing the absorptive filler and the one or more isocyanate-reactive monomers; (2) mixing the isocyanate with the absorptive filler and the one or more isocyanate-reactive monomers; and (3) mixing the catalyst with the isocyanate, the absorptive filler, and the one or more isocyanate-reactive monomers. In some embodiments, a mixing step of the method used to prepare the composite materials described herein includes mixing the liquid ingredients (i.e., the the one or more isocyanate-reactive monomers, isocyanate, catalyst, surfactants, and water) and then combining the mixed liquid ingredients with the absorptive filler and optional fiber. As the composite material exits the die or nozzle, the composite material may be placed in a mold for post-extrusion curing and shaping. For example, the composite material can be allowed to cure in individual molds or it can be allowed to cure in a continuous forming system such as a belt molding system.

An ultrasonic device can be used for enhanced mixing and/or wetting of the various components of the composite materials described herein. Such enhanced mixing and/or wetting can allow a high concentration of filler to be mixed with the polyurethane matrix. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

Also provided are methods of addressing the variance of organic carbon content in an absorptive filler to provide a composite material having a substantially constant tack-free time. The method can include mixing (1) an absorptive filler comprising organic carbon; (2) at least one isocyanate selected from the group consisting of diisocyanates, polyisocyanates, and combinations thereof; (3) one or more isocyanate-reactive monomers, wherein the one or more isocyanate-reactive monomers comprise a first isocyanate-reactive monomer which includes one or more isocyanate-reactive functional groups and a moiety configured to associate with the absorptive filler; and (4) a catalyst. The at least one isocyanate and the one or more isocyanate-reactive monomers are allowed to react in the presence of the absorptive filler and catalyst to form the composite material.

The isocyanate-reactive monomer can associate with the absorptive filler during formation of the composite material, freeing up catalyst which may otherwise be absorbed to the filler to participate in reaction of the polyurethane system. As a result, the variance in the properties of the polyurethane system (e.g., tack-free time) resulting from variation in the absorptive behavior of the catalyst (e.g., as a result of variance of organic carbon content in an absorptive filler) can be minimized. This can provide polymeric composites having consistent batch-to-batch material properties.

In some embodiments, the tack-free time of the composite material formed using the cup test described in the examples is within 10% (e.g., within 7.5%, within 5%, within 2.5%, or within 1%) of the tack-free time of a composition prepared using an identical method wherein the absorptive filler is replaced with glass beads. In certain embodiments, the absorptive filler includes fly ash.

The composite materials described herein can be foamed. The one or more isocyanate-reactive monomers and the isocyanate can be allowed to produce a foamed composite material after mixing the components according to the methods described herein. The composite materials described herein can be formed while they are actively foaming or after they have foamed. For example, the material can be placed under the pressure of a mold cavity prior to or during the foaming of the composite material. When a foaming composite material is molded by a belt molding system into a product shape, the pressure that the foamed part exerts on the belts impacts the resulting mechanical properties. For example, as the pressure of the foaming increases and if the belt system can hold this pressure without the belts separating, then the product may have higher flexural strength than if the belts allowed leaking or pressure drop.

The composite materials described herein can be formed into shaped articles and used in various applications including building materials. Examples of such building materials include siding material, roof coatings, roof tiles, roofing material, carpet backing, flexible or rigid foams such as automotive foams (e.g., for dashboard, seats or roofing), component coating, and other shaped articles. Examples of shaped articles made using composite materials described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs; guard rails; retaining walls; park benches; tables; slats; and railroad ties. The composite materials described herein further can be used as reinforcement of composite structural members including building materials such as doors; windows; furniture; and cabinets and for well and concrete repair. The composite materials described herein also can be used to fill gaps, particularly to increase the strength of solid surface articles and/or structural components. The composite materials can be flexible, semi-rigid or rigid foams. In some embodiments, the flexible foam is reversibly deformable (i.e., resilient) and can include open cells. A 8"×1"×1" piece of a flexible foam can generally wrap around a 1" diameter mandrel at room temperature without rupture or fracture. Flexible foams also generally have a density of less than 5 lb/ft$^3$ (e.g., 1 to 5 lb/ft$^3$). In some embodiments, the rigid foam is irreversibly deformable and can be highly crosslinked and/or can include closed cells. Rigid foams generally have a density of 1 lb/ft$^3$ or greater (e.g., 1 to 60 lb/ft$^3$, 5 to 60 lb/ft$^3$, 20 to 55 lb/ft$^3$, or 30 to 50 lb/ft$^3$).

The examples below are intended to further illustrate certain aspects of the compositions and methods described herein, and are not intended to limit the scope of the claims. All parts and percentages are provided on a per weight basis, unless indicated otherwise.

EXAMPLES

General Test Methods

The reactivity of the polyurethane system used to form the composite materials can be measured using the Brookfield Viscosity Test (BVT). The Brookfield Viscosity Test determines the reactivity of a polyurethane system by determining how quickly viscosity increases showing gellation of the polyurethane system. The BVT can be conducted using a standard polyurethane formulation and by replacing components in the standard polyurethane formulation (e.g. the polyols or the isocyanate) to determine the viscosity rise. Alternately, the BVT can be conducted using the actual polyurethane formulation including the components in the amounts that would be used in the actual polyurethane formulation.

The standard polyurethane formulation for use in the BVT includes the following components:

| Component | Amount (parts by wt) | Equiv Wt. | Equivalents |
|---|---|---|---|
| ARCOL LHT-240 polyol | 50.0 | 224.3 | 0.223 |
| MULTRANOL 4035 polyol | 50.0 | 148.0 | 0.338 |
| DC-197 surfactant | 1.0 | 0.0 | — |
| DABCO R-8020 catalyst | 2.0 | 110.0 | 0.018 |
| Fly ash | 460.0 | 0.0 | — |
| Water | 0.5 | 9.0 | 0.056 |

For the standard, the above components were mixed in a 600 mL glass jar at 1000 RPM for 30-seconds using any lab-duty electric stirrer equipped with a Jiffy Mixer brand, Model LM, mixing blade. MONDUR MR Light (a polymeric MDI, having a NCO weight of 31.5%, viscosity of 200 mPa·s@25° C., equivalent weight of 133, and a functionality of 2.8) was then added at an isocyanate index of 110 and the components mixed for an additional 30 seconds. The glass jar is then removed from the stirrer and placed on a Brookfield viscometer. The viscosity rise is measured using a viscometer for 20 minutes or until 50,000 mPa·s is reached. For the standard, a viscosity of 50,000 mPa·s is reached in about 550 seconds.

To test the reactivity of other components such as polyols, isocyanates and catalysts, these components replace the corresponding components used in the BVT standard polyurethane formulation. For example, to test the reactivity of a polyol, the polyol is added in an amount of 100 parts by weight and replaces the ARCOL LHT-240 and MULTRANOL 4035 polyols used in the standard polyurethane formulation. To test the reactivity of an isocyanate, the isocyanate replaces MONDUR MR Light and is added at a viscosity index of 110. A catalyst to be tested can be added in an amount of 2.0 parts by weight and replaces the DABCO R-8020 catalyst used in the standard polyurethane formulation.

To test the reactivity of an entire polyurethane system, all the standard components are replaced by those used in the polyurethane system of interest and used in the amounts they would be used in the polyurethane system of interest. The cup test as described herein is similar to the test procedure provided in ASTM D7487-08 (2008) and the general definitions, terms, safety precautions, and preparations used herein are the same as those used in ASTM D7487-08 (2008). The procedure is as follows:

1. Set the stirrer (Ryobi brand, Model DP-101) to run at 2000 rpm. The stirrer is equipped with a 2-inch diameter stirring blade, a GraLab Model 555 Electronic Timer, and an auto-reset and foot-switch controller.

2. Set the experiment formulation sheet and record sheet.

3. Wet-tare a 100 ml tri-pour beaker. Referring to the formulation sheet, add isocyanate into the beaker.

4. Weigh a 1000 ml plastic mixing cup and record the cup weight. Add the required amount of fly ash into the mixing cup (if it is being used). Then, add the required weights of all the other resin ingredients (except isocyanate) into the same mixing cup precisely. Record the weights to the nearest 0.1 gram.

5. Stir the mixture for 1 min (if fly ash is not being used, the stirring time is reduced to 15 seconds). Record the mixture temperature after stirring.

6. Add the required amount of isocyanate from the beaker (pre-weighed isocyanate in Step 3) into the mixing cup quickly (less than 30 secs) precisely. Record the weight to the nearest 0.1 gram.

7. Immerse the stirrer blade into the mixture. Simultaneously, turn on the mixer switch and start the stop-watch. Mix everything inside the cup for 15 seconds. At the end of the 15 seconds, remove the cup from the spinning mixing blade and record the mixture temperature after stirring.

8. Place the cup in a fume hood and observe. Record the characteristic parameters such as cream time, gel time, top of cup (TOC) time, tack free time, end of rise time, and maximum surface temperature. Maximum surface temperature can be measured using an infrared (IR) thermometer.

9. Clean the stirring blade thoroughly after each test using a container of acetone.

Effect of Fly Ash Composition on Tack-Free Time

Composites were prepared using seven different fly ash samples (Fly Ashes 1-7). 50 g of polyol blend 5 (33% by weight TEROL® 198 (aromatic polyester polyol; available from Oxid L.P., Houston, Tex.), 33% by weight CARPOL® GSP-355 (sucrose-based polyether polyol; available from Carpenter Co., Richmond, Va.), 33% by weight CARPOL® GP-725 (alkylene oxide-capped glycerine; available from Carpenter Co., Richmond, Va.), and 1% by weight 2-(2-hydroxyethylamino)ethanol (99%)) was mixed with 0.10 g of an amine catalyst (triethylenediamine), 0.20 g of an organotin catalyst, and 0.35 g of a silicone surfactant were mixed in a 12 oz. cup. A sample of fly ash (102 g) was added and wetted with the liquid solution. Methylene diphenyl diisocyanate (MDI; 104 index; 51.5 g) was added to the cup, and simultaneously stirring began and a timer was started. After mixing for ten seconds, the foam was allowed to rise undisturbed. When the rate of rise slowed, the surface of the foam was gently touched with a tongue depressor until the foam was found to no longer be sticky. This was recorded as the tack-free time.

FIG. 1 illustrates the tack-free times for the polyurethane system including amine-based blow and cure catalysts with several sources of fly ash. The more than two-fold change in reactivity suggested that the physical and chemical makeup of the fly ash had a major influence on the polyurethane chemistry.

The physical properties of Fly Ashes 1-7, including the surface area (BET surface area, m²/g) of the fly ash and amount of organic carbon present in the fly ash (estimated by determining loss-on-ignition (LOI), %), were measured using ASTM C618-12a and ASTM C1069-09.

TABLE 1

Physical properties of Fly Ashes 1-7.

| | BET Surface Area (m²/g) | LOI (%) | BET/LOI |
|---|---|---|---|
| Fly Ash 1 | 1.1965 | 0.383 | 3.1256 |
| Fly Ash 2 | 0.9186 | 0.247 | 3.7225 |
| Fly Ash 3 | 1.3177 | 0.278 | 4.7352 |
| Fly Ash 4 | 1.0143 | 0.240 | 4.2284 |
| Fly Ash 5 | 3.5924 | 0.843 | 4.2638 |
| Fly Ash 6 | 1.6952 | 0.661 | 2.5643 |
| Fly Ash 7 | 1.0193 | 0.413 | 2.4667 |

Figure 2:
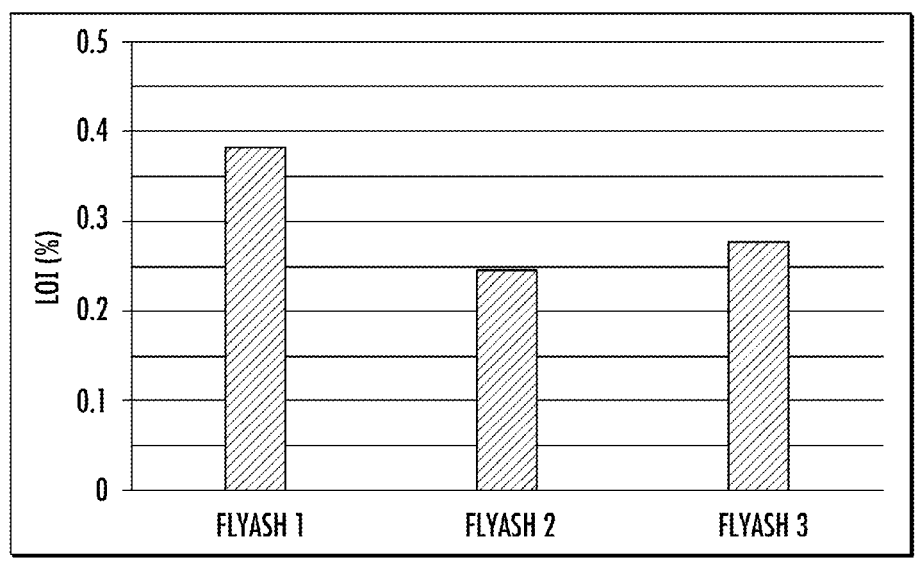
FIG. 2 is graph illustrating the loss-on-ignition (LOI) measured for three different samples of fly ash (Fly Ashes 1-3).

As shown in Table 1, the surface areas and organic carbon content of Fly Ashes 1-7 varied as a consequence of the different combustion history of each sample. In particular, some fly ash samples possessed significantly different levels of organic carbon, as indicated by different LOI values. For example, as illustrated in FIG. 2, the measured LOI was higher for Fly Ash 1 than for Fly Ash 2 or Fly Ash 3. As shown in FIG. 1, Fly Ash 1 also exhibited a greater tack-free time than Fly Ash 2 or Fly Ash 3. It was hypothesized that the higher carbon content of Fly Ash 1 resulted in greater absorption of the amine used to catalyze reaction of the polyurethane system, resulting in an increased tack-free time.

Figure 3:
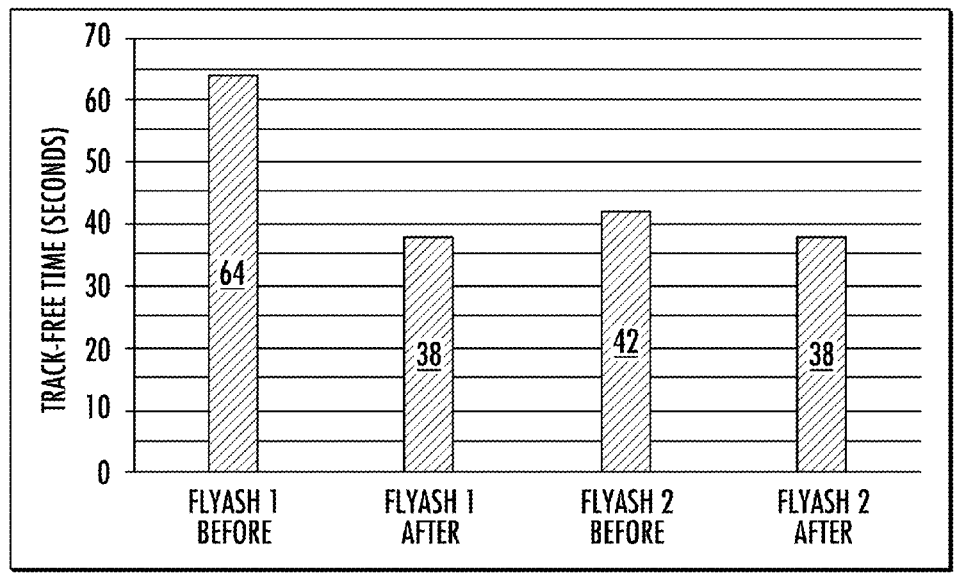
FIG. 3 is a graph illustrating the tack-free time (in seconds) of composites formed from samples of Fly Ash 1 and Fly Ash 2 before and after ignition.

To further examine the effect of carbon content upon reaction time of the polyurethane system, the tack-free time of composites formed using Fly Ash 1 and Fly Ash 2 were measured before and after ignition at 750° C. for 2 hours to consume any organic carbon present in the fly ash. A higher catalyst loading was used in these experiments to shorten reaction time. FIG. 3 illustrates the tack-free time of composites formed from samples of Fly Ash 1 and Fly Ash 2 before and after ignition. Prior to ignition, there was a 34% difference in tack-free time between composites prepared using Fly Ash 1 and Fly Ash 2. The ignited samples gave identical reaction times.

Figure 4:
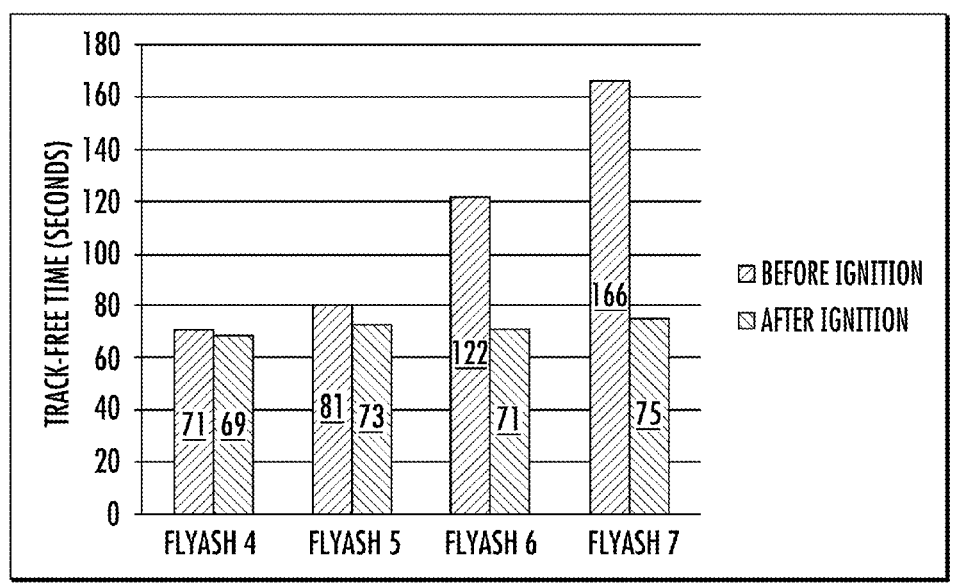
FIG. 4 is a graph illustrating the tack-free time (in seconds) of composites formed from samples of Fly Ashes 4-7 before and after ignition.

Composites formed using fly ash samples from the other sources (Fly Ashes 4-7) were also measured before and after ignition. As shown in FIG. 4, the composites exhibit variable tack-times prior to ignition; however, they all exhibit similar tack-free times following ignition. This suggests that organic carbon present in the fly ash is the root cause of variability in polyurethane chemistry between sources of fly ash.

Composites Formed from Polyurethanes Derived from a Monomer which Includes a Moiety Configured to Associate with the Fly Ash Composites were formed using polyurethanes derived from a monomer which includes a moiety configured to associate with the fly ash. In particular, composites were formed from a polyurethane formed from a polyol blend containing an amine-based polyol to examine if the amine-based polyol could function as a sacrificial agent on the fly ash with minimal effect on the overall reactivity due to their high level of use compared to amine catalysts.

Five different polyol blends (Polyol Blends 1-5) were examined. The composition of Polyol Blends 1-5 is shown in Table 2 below. Polyol Blends 1-4 included a polyol bearing an amino group. Polyol Blends 1-3 included a Mannich-based polyether polyol (CARPOL® MX-470 or CARPOL® MX-425) derived from ortho-nonylphenol, formaldehyde, and diethanolamine. Polyol Blend 4 included an alkylene oxide-capped polyamine (CARPOL® EDAP-800, propylene oxide-and ethylene oxide-capped ethylene diamine). For comparison, Polyol Blend 5 did not contain a polyol bearing an amino group.

TABLE 2

Composition of Polyol Blends 1-5.

| | Polyol Blend 1 | Polyol Blend 2 | Polyol Blend 3 | Polyol Blend 4 | Polyol Blend 5 |
|---|---|---|---|---|---|
| ¹CARPOL ® MX-470 | 33 | — | — | — | — |
| ²CARPOL ® MX-425 | — | 33 | 33 | — | — |
| ³TEROL ® 198 | 33 | 33 | 33 | 33 | 33 |
| ⁴CARPOL ® GSP-355 | 33 | 33 | 33 | 33 | 33 |
| ⁵CARPOL ® EDAP-800 | — | — | — | 33 | — |
| ⁶CARPOL ® GP-725 | — | — | — | — | 33 |
| ⁷DEOA | 1 | 1 | — | 1 | 1 |
| Glycerine | — | — | 1 | — | — |

¹Mannich-based polyether polyol; available from Carpenter Co., Richmond, VA
²Mannich-based polyether polyol; available from Carpenter Co., Richmond, VA
³Aromatic polyester polyol; available from Oxid L.P., Houston, TX
⁴Sucrose-based polyether polyol; available from Carpenter Co., Richmond, VA
⁵Alkylene oxide-capped ethylene diamine; available from Carpenter Co., Richmond, VA
⁶Alkylene oxide-capped glycerine; available from Carpenter Co., Richmond, VA
⁷2-(2-hydroxyethylamino)ethanol, 99%

50 g of each polyol blend was mixed with 0.10 g of an amine catalyst (triethylenediamine), 0.20 g of an organotin catalyst, and 0.35 g of a silicone surfactant were mixed in a 12 oz. cup. A sample of fly ash (102 g) was added and wetted with the liquid solution. Methylene diphenyl diisocyanate (MDI; 104 index; 51.5 g) was added to the cup, and simultaneously stirring began and a timer was started. After mixing for ten seconds, the foam was allowed to rise undisturbed. When the rate of rise slowed, the surface of the foam was gently touched with a tongue depressor until the foam was found to no longer be sticky. This was recorded as the tack-free time.

Figure 5:
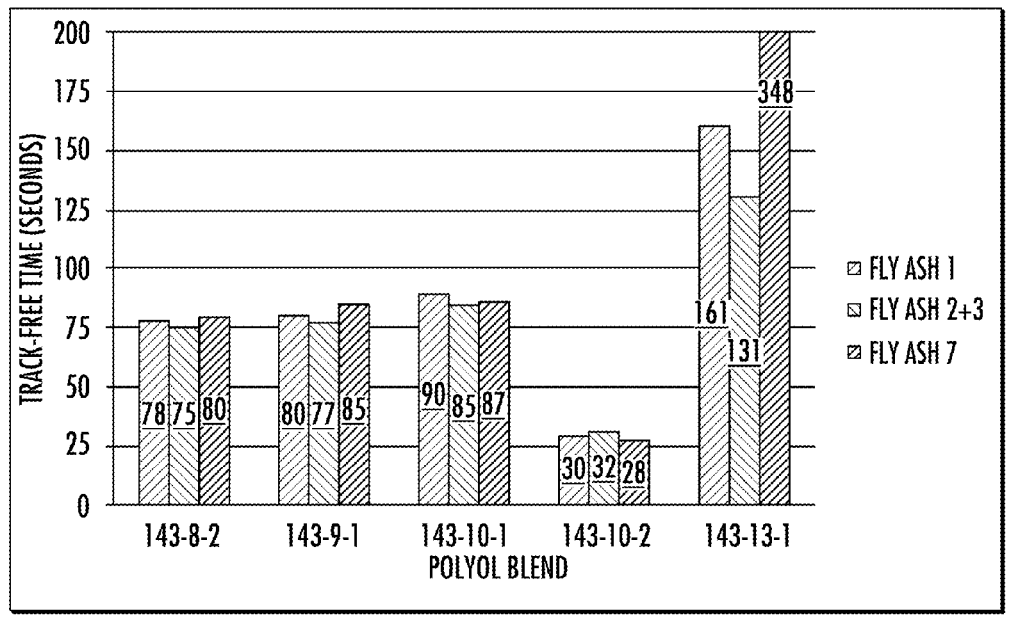
FIG. 5 illustrates the tack-free time (in seconds) of composites formed from Polyol Blends 1-5 and three different samples of fly ash (Fly Ash 1, Fly Ash 7, and a mixture of Fly Ash 2 and Fly Ash 3).

FIG. 5 illustrates the tack-free time of composites formed from Polyol Blends 1-5 and three different samples of fly ash (Fly Ash 1, Fly Ash 7, and a mixture of Fly Ash 2 and Fly Ash 3). As shown in FIG. 5, the blends made with the amine-containing polyols showed only a small difference (3-5 second difference, less than 10%) between samples made with different fly ashes. Surprisingly, the difference in tack time was small, even when comparing Fly Ash 7 (a Class F fly ash with a relatively high level of active carbon) to Fly Ash 1 and the mixture of Fly Ash 2 and Fly Ash 3 (Class C samples)

In contrast, composites prepared from Polyol Blend 5 (which does not include an amine-based polyol) exhibited much slower overall reactivity. In addition, the tack-time of the composite was highly variable depending upon the fly ash added. Composites formed from Fly Ash 1 and a mixture of Fly Ash 2 and Fly Ash 3 exhibited an approximately 20% difference in tack-free time, while composites formed from Fly Ash 7 exhibited a tack-free time more than twice the tack-free time observed for Fly Ash 1 and a mixture of Fly Ash 2 and Fly Ash 3. This confirms the ability of the amine-containing polyols to act as a sacrificial agent on the fly ash, minimizing the effect of the carbon content of the fly ash on the reaction time of the polyurethane matrix.

Composites Formed Using a Non-Absorptive Catalyst

Composites were formed from two different fly ash samples using catalyst mixtures containing varying amounts of an amine catalyst (an absorptive catalyst) and an organotin catalyst (a non-absorptive catalyst such as dimethyltin oleate). The experiments were performed as described above, with the catalyst system being modified to contain the amounts of amine and/or organotin catalyst shown in FIG. 6 for each trial.

Figure 6:
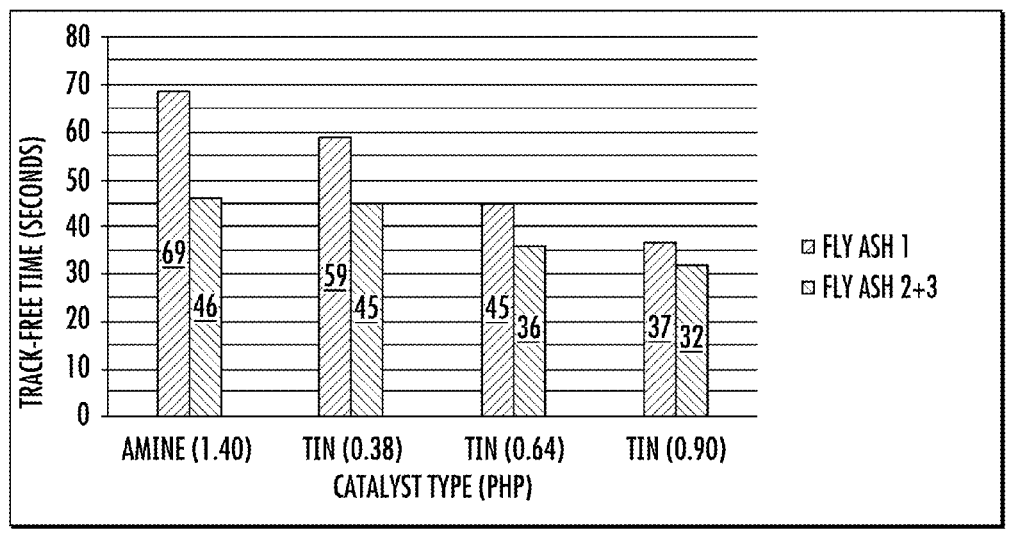
FIG. 6 is a plot showing the tack-free time (in seconds) for composites formed using an amine catalyst (triethylenediamine) and an amine catalyst (triethylenediamine) in combination with varying amounts of an organotin catalyst (dimethyltin oleate).

FIG. 6 is a plot showing the tack-free time for composites formed using an amine catalyst (triethylenediamine) and an amine catalyst (triethylenediamine) in combination with varying amounts of an organotin catalyst (dimethyltin oleate) in place of a portion of the amine catalyst. As shown in FIG. 6, as the amount of non-absorptive catalyst in the catalyst mixture increases, the difference in tack-free time between composites formed from Fly Ash 1 and a mixture of Fly Ash 2 and Fly Ash 3 decreased.

Because the tin catalyst is not absorbed on the residual carbon present in the fly ash, the variance in the carbon content of the fly ash does not exert as great of an influence on the composite's tack-free time when increasing amounts of tin catalyst are used to cure the composite. The amine catalyst, which is present in increasingly small amounts as the amount of tin catalyst is increased, is still adsorbed by the carbon in the fly ash, resulting in slight differences in reactivity of composites formed from different fly ashes, even when using a significant fraction of non-absorptive tin catalyst.

The composites, materials and methods of the appended claims are not limited in scope by the specific composites and methods described herein, which are intended as illustrations of a few aspects of the claims and any composites, materials, and methods that are functionally equivalent are intended to fall within the scope of the claims. Various modifications of the composites, materials and methods in addition to those shown and described herein are intended to fall within the scope of the appended claims. Further, while only certain representative composites, materials, and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

That which is claimed:

1. A composite comprising:
an absorptive filler comprising fly ash having at least 0.1%, by weight of the fly ash, of an organic carbon, and
a polyurethane formed by a reaction of at least one isocyanate selected from the group consisting of diisocyanates, polyisocyanates, and combinations thereof, and one or more isocyanate-reactive monomers comprising a Mannich polyol, in the presence of an amine catalyst,
wherein the Mannich polyol is in an amount from 10% to 50% by weight, based on the total weight of the one or more isocyanate-reactive monomers, and associates with the absorptive filler through a nitrogen-containing moiety; and
wherein the composite has a tack-free time that varies less than 10% regardless of the fly ash used.

2. The composite of claim 1, wherein the absorptive filler is present in an amount from 40% to 90% by weight, based on the total weight of the composite.

3. The composite of claim 1, wherein the nitrogen-containing moiety comprises an amine.

4. The composite of claim 1, wherein the Mannich polyol comprises an alkanolamine.

5. The composite of claim 4, wherein the alkanolamine comprises a dialkanolamine which includes two hydroxy-substituted C1-C12 alkyl groups, or a trialkanolamine which includes three hydroxy-substituted C1-C12 alkyl groups.

6. The composite of claim 1, wherein the Mannich polyol comprises an alkoxylated polyamine derived from a polyamine and an alkylene oxide.

7. The composite of claim 1, wherein the Mannich polyol is derived from a substituted or unsubstituted phenol and an alkanolamine.

8. The composite of claim 7, wherein the Mannich polyol is further derived from an alkylene oxide.

9. The composite of claim 1, wherein the Mannich polyol is from 10% to 40% by weight of the one or more isocyanate-reactive monomers.

10. The composite of claim 1, wherein the one or more isocyanate-reactive monomers further comprises a highly reactive polyol, wherein at least 75% of the hydroxyl groups in the highly reactive polyol comprise primary hydroxyl groups.

11. The composite of claim 10, wherein the highly reactive polyol is from 10% to 40% by weight of the one or more isocyanate-reactive monomers.

12. The composite of claim 1, wherein the one or more isocyanate-reactive monomers further comprises a polyester polyol, a polyether polyol, or a combination thereof.

13. The composite of claim 12, wherein the polyester polyol comprises an aromatic polyester polyol.

14. A method of preparing a composite material, comprising:
mixing (1) an absorptive filler comprising fly ash having at least 0.1%, by weight of the fly ash, of an organic carbon; (2) at least one isocyanate selected from the group consisting of diisocyanates, polyisocyanates, and combinations thereof; (3) one or more isocyanate-reactive monomers comprising a Mannich polyol; and (4) an amine catalyst; and
allowing the at least one isocyanate and the one or more isocyanate-reactive monomers to react in the presence of the absorptive filler and the amine catalyst to form the composite material,
wherein the Mannich polyol is in an amount from 10% to 50% by weight, based on the total weight of the one or more isocyanate-reactive monomers, and associates with the absorptive filler through a nitrogen-containing moiety; and
wherein the composite material has a tack-free time that varies less than 10% regardless of the fly ash used.

15. The composite of claim 1, wherein the one or more isocyanate-reactive monomers comprise an alkylene-oxide capped Mannich polyol.

16. The composite of claim 1, wherein the amine catalyst is selected from 1,4-diazabicyclo[2.2.2]octane, triethylenediamine, and tetramethylbutanediamine.

17. A composite comprising:
40-90% by weight of the composite of fly ash, the fly ash comprising at least 0.1% by weight of the fly ash of an organic carbon, and
a polyurethane formed from a reaction of at least one isocyanate selected from the group consisting of diisocyanates, polyisocyanates, and combinations thereof, and one or more isocyanate-reactive monomers comprising a Mannich polyol and an aromatic polyester polyol, in the presence of an amine catalyst,
wherein the Mannich polyol is in an amount from 10% to 50% by weight, based on the total weight of the one or more isocyanate-reactive monomers, and associates with the fly ash through a nitrogen-containing moiety; and
wherein the composite has a tack-free time that varies less than 10% regardless of the fly ash used.

18. The composite of claim 1, wherein the Mannich polyol is from 10% to 25% by weight of the one or more isocyanate-reactive monomers.

19. The composite of claim 17, wherein the Mannich polyol is from 10% to 25% by weight of the one or more isocyanate-reactive monomers.

* * * * *